US010592064B2

(12) United States Patent
Ames et al.

(10) Patent No.: US 10,592,064 B2
(45) Date of Patent: Mar. 17, 2020

(54) APPROACHES FOR THREE-DIMENSIONAL OBJECT DISPLAY USED IN CONTENT NAVIGATION

(71) Applicant: Amazon Technologies, Inc., Reno, NV (US)

(72) Inventors: Charley Ames, Seattle, WA (US); Dennis Pilarinos, Vancouver (CA); Peter Frank Hill, Seattle, WA (US); Sasha Mikhael Perez, Seattle, WA (US); Timothy Thomas Gray, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 30 days.

(21) Appl. No.: 14/029,736

(22) Filed: Sep. 17, 2013

(65) Prior Publication Data

US 2015/0082180 A1 Mar. 19, 2015

(51) Int. Cl.
*G06F 3/0481* (2013.01)
*G06F 1/16* (2006.01)
(Continued)

(52) U.S. Cl.
CPC ........ *G06F 3/04815* (2013.01); *G06F 1/1626* (2013.01); *G06F 1/1694* (2013.01);
(Continued)

(58) Field of Classification Search
CPC .. G06F 3/04815; G06F 3/0482; G06F 3/0481; G06F 17/211; G06F 17/30873;
(Continued)

(56) References Cited

U.S. PATENT DOCUMENTS

| 6,161,112 A | 12/2000 | Cragun | |
|---|---|---|---|
| 6,795,972 B2 * | 9/2004 | Rovira | H04N 7/163 348/E5.002 |

(Continued)

FOREIGN PATENT DOCUMENTS

| CA | 2924496 | 3/2015 |
|---|---|---|
| CN | 1505869 | 6/2004 |

(Continued)

OTHER PUBLICATIONS

WO 1998/014882, Harvey et al., Synchronization of Interactions between objects distributed over a network in the presence of latency, published Apr. 9, 1998, pp. 1-65.*

(Continued)

*Primary Examiner* — Sang H Kim
(74) *Attorney, Agent, or Firm* — Hogan Lovells US LLP

(57) ABSTRACT

Approaches enable three-dimensional (3D) display and interaction with interfaces (such as a webpage, an application, etc.) when the device is operating in a 3D view mode. For example, interface elements can be highlighted, emphasized, animated, or otherwise altered in appearance, and/or arrangement in the renderings of those interfaces based at least in part on an orientation of the device or a position of a user using the device. Further, the 3D view mode can provide for an animated 3D departure and appearance of elements as the device navigates from a current page to a new page. Further still, approaches provide for the ability to specify 3D attributes (such as the appearance, action, etc.) of the interface elements. In this way, a developer of such interfaces can use information (e.g., tags, CSS, JavaScript, etc.) to specify a 3D appearance change to be applied to at least one interface element when the 3D view mode is activated.

19 Claims, 20 Drawing Sheets

(51) Int. Cl.
*G06F 3/01* (2006.01)
*G06F 3/0346* (2013.01)

(52) U.S. Cl.
CPC .............. *G06F 3/012* (2013.01); *G06F 3/013* (2013.01); *G06F 3/0346* (2013.01); *G06F 2203/04802* (2013.01)

(58) Field of Classification Search
CPC .. G06F 17/30905; G06F 3/0483; G06F 3/013; G06F 2200/1637; G06F 3/0346; G06F 2203/04802; G06F 17/2247; G06F 17/30896; G06F 3/017; G06F 17/3089; G06F 3/041; G06T 19/00; G06T 15/20; H04N 21/4312
USPC .................................. 715/738, 782; 345/169
See application file for complete search history.

(56) References Cited

U.S. PATENT DOCUMENTS

| | | | |
|---|---|---|---|
| 7,107,549 B2 * | 9/2006 | Deaton | G06F 3/04815 707/E17.111 |
| 7,685,619 B1 * | 3/2010 | Herz | H04N 5/44543 715/719 |
| 7,788,323 B2 * | 8/2010 | Greenstein | G06Q 10/10 709/204 |
| 8,402,382 B2 * | 3/2013 | Agarawala | G06F 3/0483 345/173 |
| 9,152,984 B1 | 10/2015 | Shoettler | |
| 2002/0026440 A1 | 2/2002 | Nair | |
| 2002/0113820 A1 * | 8/2002 | Robinson | G06F 17/30873 715/764 |
| 2002/0160817 A1 | 10/2002 | Salmimaa et al. | |
| 2002/0163546 A1 * | 11/2002 | Gallo | G06F 3/0481 715/848 |
| 2003/0214517 A1 | 11/2003 | Gossweiler, III | |
| 2005/0204306 A1 | 9/2005 | Kawahara | |
| 2005/0289482 A1 | 12/2005 | Anthony | |
| 2006/0133664 A1 * | 6/2006 | Hong | G06F 3/0483 382/154 |
| 2006/0149728 A1 | 7/2006 | Error | |
| 2006/0238383 A1 | 10/2006 | Kimchi et al. | |
| 2007/0011617 A1 | 1/2007 | Akagawa | |
| 2007/0124699 A1 | 5/2007 | Michaels | |
| 2007/0164988 A1 | 7/2007 | Ryu | |
| 2007/0192794 A1 | 8/2007 | Curtis et al. | |
| 2007/0291035 A1 | 12/2007 | Vesely | |
| 2008/0036776 A1 * | 2/2008 | Niles | G06F 3/04815 345/474 |
| 2008/0083039 A1 | 4/2008 | Choi | |
| 2008/0209442 A1 * | 8/2008 | Setlur | H04M 1/0222 719/318 |
| 2008/0301579 A1 | 12/2008 | Jonasson | |
| 2008/0307341 A1 | 12/2008 | Ferry et al. | |
| 2008/0307360 A1 * | 12/2008 | Chaudhri | G06F 3/0481 715/835 |
| 2009/0144201 A1 | 6/2009 | Gierkink et al. | |
| 2009/0172328 A1 | 7/2009 | Sahita | |
| 2009/0179914 A1 | 7/2009 | Dahlke | |
| 2009/0187862 A1 | 7/2009 | DaCosta | |
| 2009/0222276 A1 | 9/2009 | Romney | |
| 2009/0313584 A1 | 12/2009 | Kerr | |
| 2010/0064209 A1 * | 3/2010 | Wielgosz | G06F 17/30896 715/236 |
| 2010/0079371 A1 | 4/2010 | Kawakami | |
| 2010/0125816 A1 | 5/2010 | Bezos | |
| 2010/0169837 A1 * | 7/2010 | Hyndman | G06F 3/04815 715/848 |
| 2010/0257468 A1 | 10/2010 | Bernardo | |
| 2010/0295958 A1 | 11/2010 | Larsson | |
| 2010/0309228 A1 | 12/2010 | Mattos | |
| 2010/0332995 A1 | 12/2010 | Chen | |
| 2011/0099492 A1 * | 4/2011 | Park | G06F 3/0481 715/764 |
| 2011/0161843 A1 * | 6/2011 | Bennett | G06F 3/14 715/760 |
| 2011/0029907 A1 | 9/2011 | Bakhash | |
| 2011/0246877 A1 | 10/2011 | Kwak | |
| 2011/0246950 A1 | 10/2011 | Luna | |
| 2011/0248987 A1 * | 10/2011 | Mitchell | G06T 15/20 345/419 |
| 2011/0231878 A1 | 12/2011 | Hunter et al. | |
| 2012/0036433 A1 * | 2/2012 | Zimmer | G06T 15/20 715/702 |
| 2012/0054690 A1 | 3/2012 | Lim | |
| 2012/0086629 A1 | 4/2012 | Thorn | |
| 2012/0131496 A1 | 5/2012 | Gooseens et al. | |
| 2012/0179904 A1 | 7/2012 | Dunn | |
| 2012/0188169 A1 | 7/2012 | Yankovich | |
| 2012/0212503 A1 | 8/2012 | Liao et al. | |
| 2012/0256967 A1 | 10/2012 | Baldwin | |
| 2012/0313957 A1 * | 12/2012 | Fisher | G06T 11/206 345/589 |
| 2013/0038490 A1 | 2/2013 | Garcia | |
| 2013/0061293 A1 | 3/2013 | Mao | |
| 2013/0091462 A1 | 4/2013 | Gray | |
| 2013/0093764 A1 * | 4/2013 | Andersson | G06F 9/4443 345/419 |
| 2013/0069937 A1 | 5/2013 | Kim | |
| 2013/0106831 A1 | 5/2013 | Lee | |
| 2013/0141324 A1 | 6/2013 | Zambrano | |
| 2013/0174201 A1 * | 7/2013 | Tam | H04N 21/482 725/40 |
| 2013/0181892 A1 | 7/2013 | Liimatainen | |
| 2013/0198641 A1 | 8/2013 | Brownlow | |
| 2013/0246954 A1 | 9/2013 | Gray | |
| 2013/0262233 A1 | 10/2013 | Bradley | |
| 2013/0305150 A1 * | 11/2013 | Budavari | G06F 17/211 715/277 |
| 2013/0326425 A1 | 12/2013 | Forstall | |
| 2014/0037218 A1 | 2/2014 | Zweig | |
| 2014/0198227 A1 * | 7/2014 | Mohammad Mirzaei | G01C 21/12 348/208.2 |
| 2014/0250376 A1 * | 9/2014 | Jojic | G06F 17/30716 715/273 |
| 2014/0267241 A1 * | 9/2014 | Keondjian | G06F 17/30058 345/419 |
| 2014/0325455 A1 | 10/2014 | Tobin | |
| 2014/0375680 A1 * | 12/2014 | Ackerman | G06T 19/006 345/633 |
| 2015/0009303 A1 | 1/2015 | Zuidema | |
| 2015/0035821 A1 | 2/2015 | Andriotis | |
| 2015/0062121 A1 | 3/2015 | Karakotsios | |
| 2015/0082145 A1 | 3/2015 | Ames et al. | |
| 2015/0082180 A1 | 3/2015 | Ames et al. | |
| 2015/0082181 A1 | 3/2015 | Ames | |
| 2015/0085076 A1 | 3/2015 | Lockhart | |
| 2015/0091903 A1 | 4/2015 | Costello | |
| 2015/0170397 A1 | 6/2015 | Han | |

FOREIGN PATENT DOCUMENTS

| | | |
|---|---|---|
| CN | 1309177 | 4/2007 |
| CN | 101019422 | 10/2010 |
| CN | 105814532 | 7/2016 |
| EP | 1667471 | 6/2006 |
| EP | 1884863 | 2/2008 |
| EP | 2458478 | 5/2012 |
| EP | 3047363 | 7/2016 |
| JP | 2002-133263 | 5/2002 |
| JP | 2003-532189 | 10/2003 |
| JP | 2007-049744 | 2/2007 |
| JP | 4926207 | 5/2012 |
| JP | 5513071 | 6/2014 |
| JP | 5532080 | 6/2014 |
| JP | 6200080 | 9/2017 |
| JP | 6201058 | 9/2017 |
| WO | 1998/14882 | 4/1998 |
| WO | 01/82065 | 11/2001 |

(56) References Cited

FOREIGN PATENT DOCUMENTS

WO        2013052789      4/2013
WO        2015/042048     5/2015

OTHER PUBLICATIONS

"Non-Final Office Action dated Nov. 5, 2015" received in U.S. Appl. No. 14/029,747.
"Non-Final Office Action dated Aug. 6, 2015" received in U.S. Appl. No. 14/029,756.
International Search Report and Written Opinion issued in PCT/US2014/055878 dated Apr. 6, 2015.
"Non Final Office Action dated Oct. 4, 2016" received in U.S. Appl. No. 14/029,747.
"Office Action dated Feb. 6, 2017" received in Canadian Application No. 2924496.
"Office Action dated Feb. 6, 2017" received in Japanese Application No. 2016-542873.
"Extended European Search Report dated Nov. 29, 2016" received in European Application 14846399.5.
U.S. Final Office Action issued in U.S. Appl. No. 14/029,756 dated Feb. 12, 2016.
U.S. Final Office Action issued in U.S. Appl. No. 14/029,747 dated Apr. 27, 2016.
PCT International Preliminary Report on Patentability issued in application serial No. PCT/US2014/055878 dated Mar. 22, 2016.
Final Office Action dated Apr. 20, 2017 received in co-related U.S. Appl. No. 14/029,747.
Non-Final Office Action dated Feb. 7, 2018 received in co-related U.S. Appl. No. 14/029,747.
Final Office Action dated Jul. 6, 2018 received in co-related U.S. Appl. No. 14/029,747.
Non-Final Office Action dated Feb. 15, 2019 received in co-related U.S. Appl. No. 14/029,747.
Final Office Action dated Jul. 17, 2019 received in co-related U.S. Appl. No. 14/029,747.
Non-Final Office Action dated Apr. 6, 2017 received in U.S. Appl. No. 14/029,756.
Final Office Action dated Dec. 13, 2017 received in U.S. Appl. No. 14/029,756.
Notice of Allowance dated May 9, 2018 received in U.S. Appl. No. 14/029,756.
Canadian Office Action dated Feb. 1, 2018 received in corresponding Canadian Patent Application No. 2,924,496.
Canadian Office Action dated Nov. 27, 2018 received in corresponding Canadian Patent Application No. 2,924,496.
Notice of Publication dated Aug. 3, 2016 received in corresponding Chinese Patent Application No. 201480051260X.
First Chinese Office Action dated Jun. 1, 2018 received in corresponding Chinese Patent Application No. 201480051260X.
Chinese Office Action dated May 7, 2019 received in corresponding Chinese Patent Application No. 201480051260X.
Notice of Publication dated Jun. 29, 2016 received in European Application 14846399.5.
Extended European Search Report dated Apr. 21, 2017 received in European Application 14846399.5.
European Office Action dated Mar. 1, 2018 received in corresponding European Patent Application No. 14846399.5.
Summons to Attend Oral Proceedings dated Nov. 14, 2018 received in European Patent Application No. 14846399.5.
Sakagami H et al: "Effective personalization of push-type systems-visualizing information freshness", Computer Networks and ISDN Systems, North Holland Publishing. Amsterdam, NL, vol. 30, No. 1-7, Apr. 1, 1998 (Apr. 1, 1998), pp. 53-63, XP004121440, ISSN: 0169-7552, DOI: 10.1016/S0169 7552(98)00060-9.
Brief Communication on Oral Proceedings dated Mar. 13, 2019 received in European Patent Application No. 14846399.5.
Communication Under Rule 71(3) EPC issued in co-related European Application No. 14846399.5 dated May 29, 2019.
Decision to Grant a Patent dated Jul. 20, 2017 issued in co-related Japanese Patent Application No. 2016-542873.
Japanese Office Action dated Jun. 25, 2018 issued in co-related Japanese Patent Application No. 2017-162984.
Japanese Office Action dated Feb. 25, 2019 issued in co-related Japanese Patent Application No. 2017-162984.
Decision to Grant issued in Japanese Divisional Application No. 2017-162984 dated Sep. 18, 2019.
Decision to Grant issued in European Application No. 14846399.5 dated Oct. 10, 2019.
Non-Final Office Action issued in related U.S. Appl. No. 14/029,747 dated Nov. 25, 2019.
Third Office Action issued in related Chinese Application No. 201480051260 dated Dec. 5, 2019.

* cited by examiner

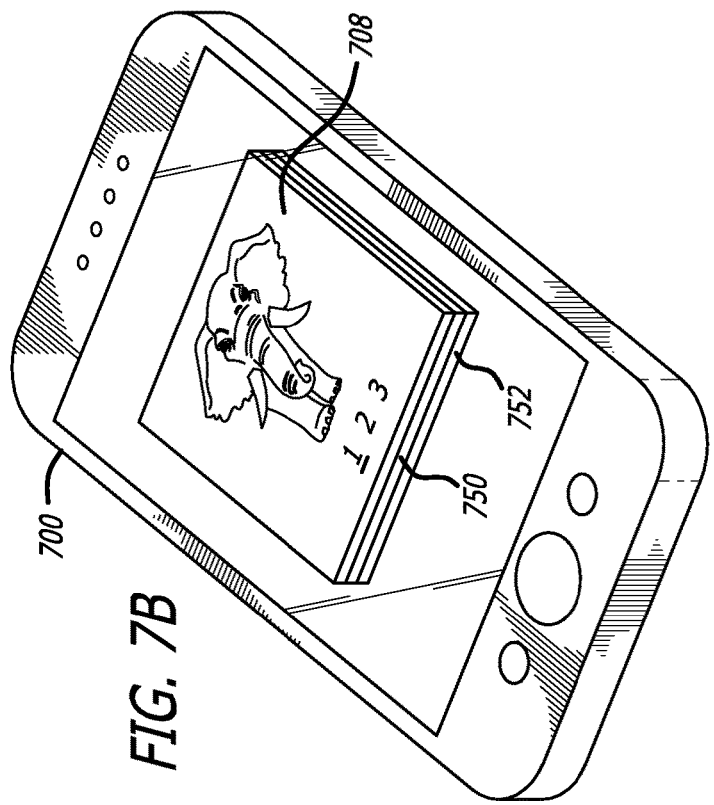
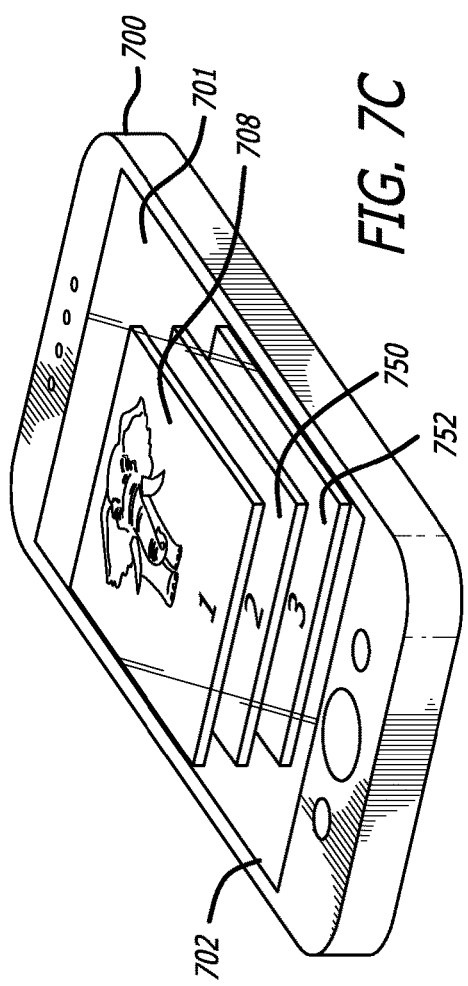
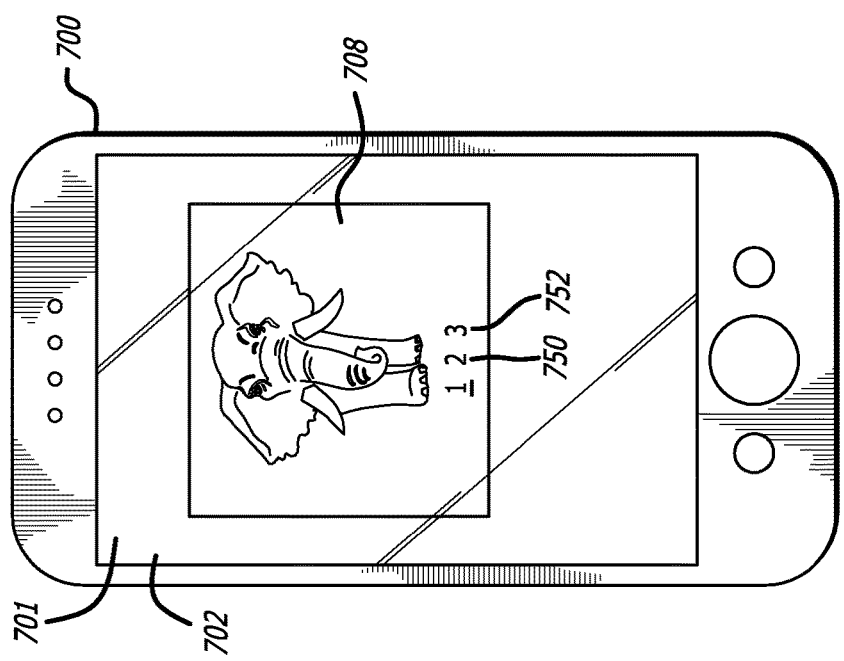

APPROACHES FOR THREE-DIMENSIONAL OBJECT DISPLAY USED IN CONTENT NAVIGATION

BACKGROUND

People are increasingly interacting with computers and other electronic devices to perform a wide variety of tasks. In order to help users to navigate and perform these tasks in more intuitive and user-friendly ways, interfaces are increasingly providing new views and types of interactivity. One such approach involves animating, highlighting, or otherwise emphasizing aspects of content that may be of interest to a user. While such approaches can enhance a user's experience in interacting with such content, in many situations the content is not organized or presented in an intuitive way. For example, it can be difficult for a user to locate desired content due to the manner in which it is presented on the display screen of the computing device. Further, due to small form factor of portable computing devices, often times content displayed on web pages, documents, applications, and/or forms cannot be displayed to a user in an intuitive and user-friendly way.

BRIEF DESCRIPTION OF THE DRAWINGS

Various embodiments in accordance with the present disclosure will be described with reference to the drawings, in which:

FIGS. 7(a), 7(b), and 7(c) illustrate a various states of an interface that can be rendered in accordance with various alternate embodiments;

DETAILED DESCRIPTION

Figure 1:
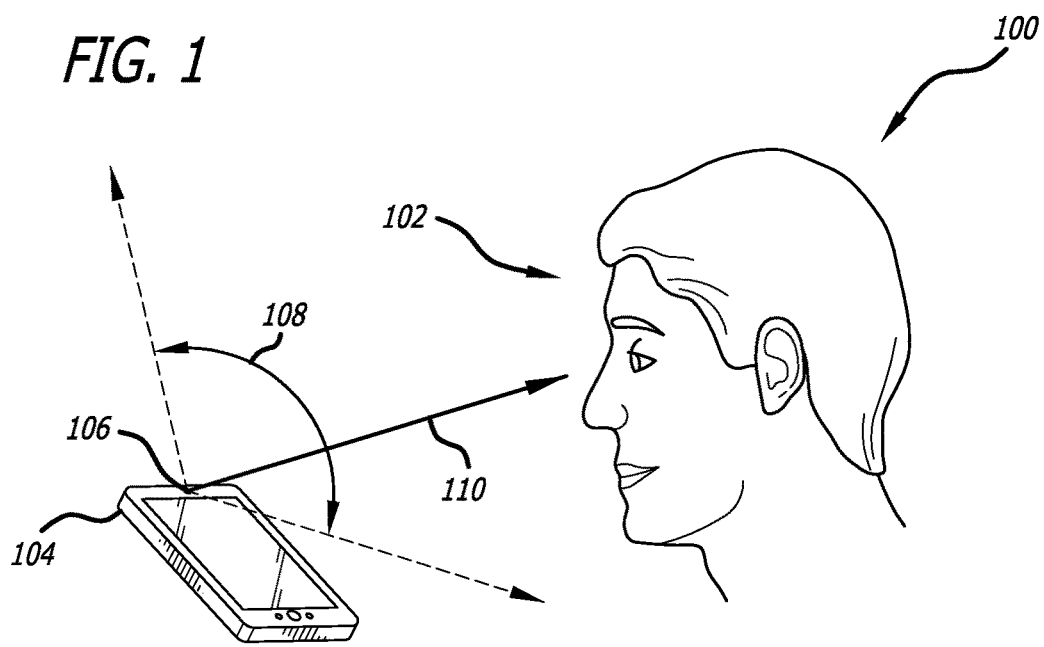
FIG. 1 illustrates an example situation where a user can view content and interact with a computing device in accordance with various embodiments.

Systems and methods in accordance with various embodiments of the present disclosure may overcome one or more of the aforementioned and other deficiencies experienced in conventional approaches to enabling a user to interact with an electronic device. In particular, various approaches enable three-dimensional (3D) display and interaction with interfaces (such as a webpage, a content page, an application, etc.) when the device is operating in a 3D view mode. For example, various embodiments enable interface elements to be highlighted, emphasized, animated, or otherwise altered in appearance, and/or arrangement in the renderings of those interfaces. This can include bringing an element "forward" toward the front of the display screen in a 3D display or quasi-three-dimensional rendering on a two-dimensional (2D) display element. For example, interface elements can appear to be positioned and/or displayed in 3D space such that that certain interface elements (e.g., text, images, etc.) become larger in 3D depth and/or appear closer to a surface of a display screen of the computing device, while other interface elements (e.g., advertisements) "fall back" or appear smaller in 3D depth. As the user tilts, rotates, or otherwise changes the orientation of the device, or performs a gesture (e.g., waves at the device) or touch input, the interface elements can move back and forth or otherwise change shape or appearance. In some situations, the amount of 3D depth or appearance can be based on a user profile that can be used to provide a more personalized view of the content or a document profile that can be used to provide a default view content. In various embodiments, the appearance of the interface is caused to be altered in appearance based on the relative position of the user to the device, which can be determined by capturing images using at least one camera of a computing device, and analyzing the images to determine the relative position of the user's head or eyes with respect to the device. Changes in the orientation and/or position of the computing device can also be determined using at least one motion sensor of the device, in order to provide for a higher sampling frequency than might otherwise be possible using the image information captured by the camera, or otherwise attempt to improve the relative position determinations. In some situations, a sensor remote, separate, or otherwise in communication with the device can be used to detect a change in orientation and/or position of the device. The orientation information can be received at the device from the sensor, and the device can cause the appearance of the interface to be altered based at least in part on the received orientation and/or position information. In some situations, the orientation and/or position information received by the sensor can be used to activate the 3D view mode. Accordingly, a user can view and interact with interface elements of the interface, and can maneuver through the various interface elements using various approaches discussed and suggested herein.

In certain embodiments, when a request is received to navigate from a first content page (e.g., webpage) to a second content page, the device can cause to be animated a 3D departure of at least a subset of the interface elements from the 3D view of the first content page on the display screen. For example, a content page (e.g., a webpage) can include one or more interface elements, such as an image, a header, article text, etc. As described, when the device operates in a 3D view mode, interface elements can be to be highlighted, emphasized, animated, or otherwise altered in appearance and/or arrangement. In accordance with various embodiments, the 3D view mode can be activated in response to a number of different activation events. For example, the 3D view mode can be activated in response to detecting a change in an orientation and/or position of the device, such as a tilt, rotation, shake, etc., of the device. Additionally or alternatively, the 3D view mode can be activated through touch input, voice input, and/or gesture input, among other input types. In some situations, the 3D view mode can be activated when the user runs a particular application. In various embodiments, the user can select when and what applications can operate in the 3D view mode. For example, the user can control whether the 3D view mode is always active, never active, or active for particular intervals of time. The user can select which applications (if any) operate in the 3D view mode. Further, as described, the 3D view mode can be activated by a remote sensor. For example, when the device is within a predetermined or detectable range of the sensor, the 3D view mode can be activated.

In accordance with various embodiments, the 3D view mode can also provide for an animated 3D departure and appearance of elements as the device navigates from a current page to a new page. The animation can include "dropping" in 3D space the first page, wherein as the interface elements drop, at least a subset of the interface elements can be shown as traveling away from a user at different speeds. Accordingly, the interface elements can be shown as rotating, turning, or being animated in a number of different ways and at different speeds as the interface elements exit the display screen. The animation can further show a 3D appearance of one or more interface elements of a second content page appearing on the display screen appearing in place of the interface elements of the first page. Such animation can advantageously be used to mask latency while loading pages and can be used to modify or otherwise enhance the appearance of a page. It should be noted that various other animations are possible in accordance with embodiments described herein.

Various embodiments provide for the ability to specify 3D attributes (such as the appearance, action, etc.) of the interface elements. For example, a developer of such pages can use information (e.g., tags, CSS, JavaScript, etc.) to specify a 3D appearance change to be applied to at least one interface element when the 3D view mode is activated. In various embodiments, the interface may determine the 3D appearance change to be applied to at least one element of the interface, without the developer specifying the 3D appearance change. For example, the interface can utilize a document object model (DOM) hierarchy or other model hierarchy that includes such information to determine how to display or otherwise alter the appearance of the interface elements in 3D space (e.g., such as by bringing an element "forward" toward the front of the display screen or bringing an element "back" from the front of the display screen).

Various other applications, processes, and uses are presented below with respect to the various embodiments.

FIG. 1 illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera 106 operable to perform functions such as image and/or video capture. The device can include additional image capture elements as well, as may include at least one other camera, a charge-coupled device (CCD), a motion detection sensor, or an infrared sensor, among others. In this example, the user 102 is located in a relative position with respect to the device, such that the point of view of the user follows a determinable trajectory 110 between the user's head or eyes and the device. As discussed herein, the device can use information such as information indicative of the device's orientation as well as information indicative of the position of the user's head or eyes to render an interface on a display screen or other such element of the computing device to enable 3D display and interaction with the interface (e.g. a webpage) when the device is operating in a 3D view mode. In accordance with various embodiments, when operating in the 3D view mode, the display screen gives the appearance of 3D, or 3D-like behavior, but might be a standard 2D display. Accordingly, various embodiments enable interface elements (e.g., images, text, advertisements, etc.) to be highlighted in the renderings of those interfaces, such as by bringing an element "forward" toward the front of the display screen in a 3D display or quasi-three-dimensional rendering on a 2D display element based on an orientation of the computing device, as well as a position of the user's head or eyes. The rendering can update as the user's point of view relative to the computing device changes as a result of movement of the user and/or the computing device as well as a change in the orientation of the device. Further, the rendering can utilize 3D mapping information, such as a set of layer depths or z-levels, to determine how to relate various interface elements to each other.

Figure 2:
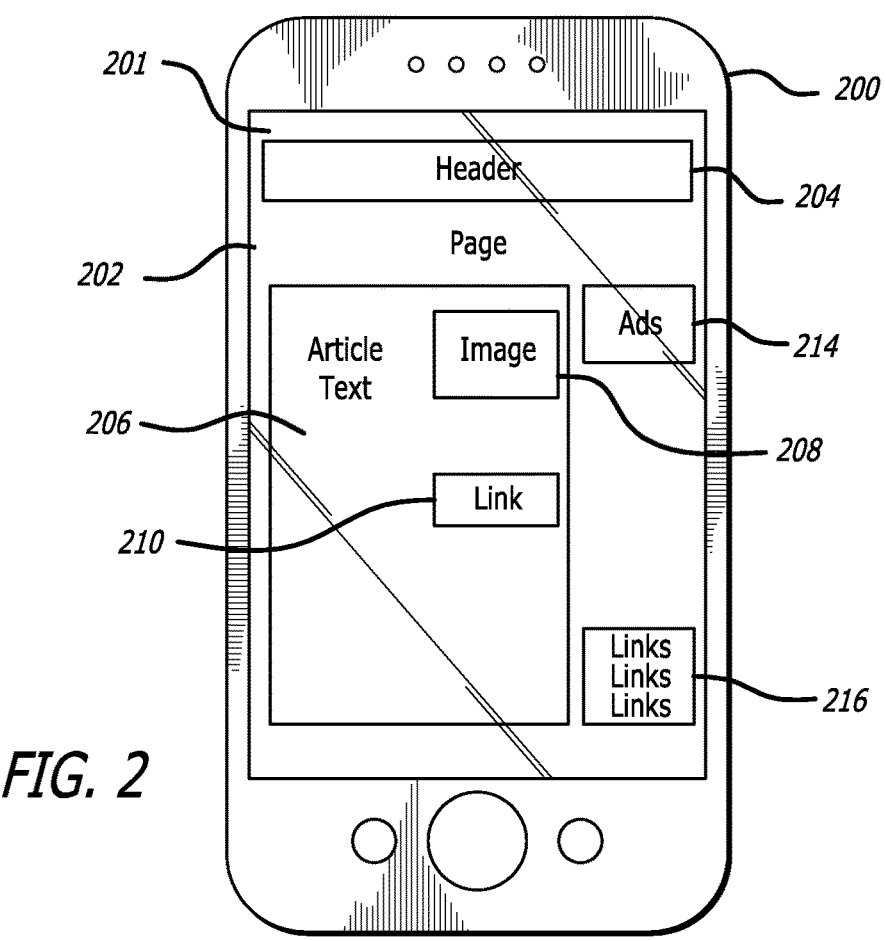
FIG. 2 illustrates an example state of an interface that can be rendered in accordance with an embodiment.

For example, FIG. 2 illustrates an example interface on a display screen 202 of a computing device 200. In this example, a user is viewing a conventional 2D representation of a webpage 201. As with many conventional webpages, the areas of the webpage can be divided into zones or areas depending on the content type, the markup of the webpage, visual classification of the webpage, and/or white space analysis of the webpage. In this example, the webpage includes a header 204, article text 206, at least one image 208, at least one link 210, advertisements 214, and various other links 216. It should be understood, however, that aspects of the various embodiments can be used with a variety of types of interface, which can include a wide variety of different interface elements with which a user can interact. In this example, the user is able to select an interface element by touching an area of the display screen 202 that is associated with that interface element. Approaches for enabling a user to interact with a touch-sensitive display screen using a finger or other such object are well known in the art and as such will not be discussed in detail herein. Various other selection approaches can be used as well, such as to move a cursor, perform a gesture, or speak a voice command, among others.

As mentioned, when the device operates in a 3D view mode, the device can alter the rendering of interface elements such as to illustrate a 3D representation of the interface elements. In various embodiments, a user can enter such a mode by changing an orientation of the device such as by tilting, rotating, translating, flicking, or otherwise adjusting a relative orientation of the device with respect to the user. Various other approaches can be used to cause the device to enter the 3D view mode, such as a voice command, touch input, gesture input, among other detectable inputs. Thereafter, one or more interface elements of the can be caused to appear to be positioned and/or displayed in 3D space in different heights. In some embodiments, the height of each interface element can relate to what a user of the device is most interested in. In this way, the height of the interface elements can visually indicate relevant or important information. For example, the most important part of an article can be raised so it is the largest and easiest to read. Less important content can be move backwards in 3D space. For example, advertisements can appear recessed from the display screen. In some situations, advertises can compete for height on webpages, where more expensive or relevant advertisements can be visualized higher in space than other advisements or interface elements.

Figure 3A:
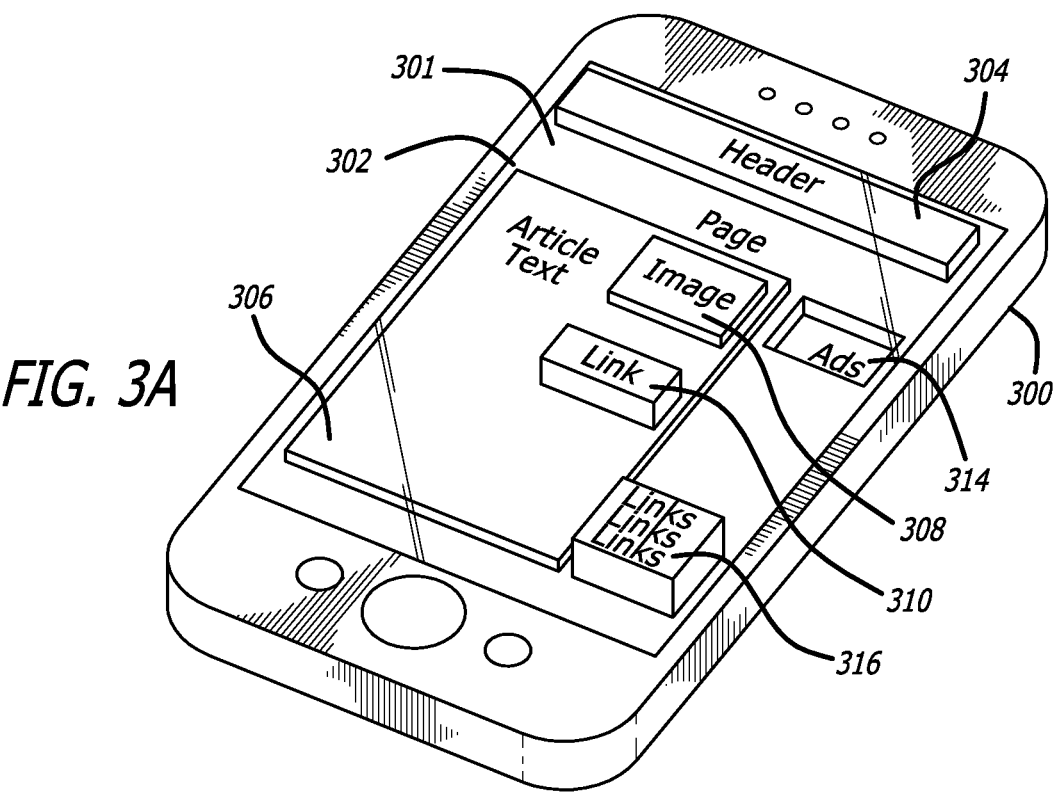
FIGS. 3(a) and 3(b) illustrate a various states of an interface that can be rendered in accordance with various embodiments.

As shown in FIG. 3(a), upon detecting an activation of the 3D view mode, the interface 301 displayed on a display screen 302 of a computing device 300 can be rendered to have at least two (and in many situations more) different "levels" or z-depths, where the upper level of some interface elements is rendered to appear near the outer surface of the display screen and the upper level of other interface elements can be rendered to appear at a lower level to the interface (e.g., separated a distance from the outer surface of the display screen). As described, the interface elements can include a header 304, article text 306, at least one image 308, at least one link 310, advertisements 314, and various other links 316, among others.

In various embodiments, interface elements rendered to appear at an upper level can be those elements determined to be more important or relevant to a user. These elements can include relevant links, articles images, etc. As will be described later herein, important or relevant elements and/or content can be determined based on information about a user, as may be included in one or more user profiles. In this example, the links 316 element is rendered to appear to be in the upper level. Such rendering can take many forms, such as slightly enlarging the element, creating and/or adjusting a rendered shadow for the element, increasing a sharpness or focus level of the element, adjusting a color or shading of the element, etc. Various other elements such as the image 308 element can be rendered to appear to be located on the upper level as well. As illustrated in this example, the interface elements determined to less important or other elements of the interface can be rendered to appear to be located at a lower level of the interface. For example, advertisements 314 can be rendered to appear smaller (e.g., shorter) or recessed than the interface elements determined to be important to a user, and might have shading, blur, or less color intensity to make the elements appear to be further back from the display screen, etc. In various embodiments, the interface can be at least somewhat animated, such that certain elements of importance or little to no importance can slowly adjust in appearance to have that interface element appear to move "forward" or "backward" in the interface as the orientation of the device and/or the relative position of the user changes.

In accordance with various embodiments, the importance of an interface element can be based at least in part one of a user profile, a page profile, a combination of the user profile and page profile, or other information. For example, a user profile can include information indicative of a user's viewing preferences, browsing history, and/or other personal information associated with a user. A user can have multiple profiles, such as an operating system profile, a profile associated with one or more applications, an online social networking profile, among others, and the information included in any of these profiles can be used to determine important or relevant content. For example, the user profile can be used to determine a user's interest in sports, health, finance, news, etc., which in turn can be used to determine a relative size (e.g., extrusion from the interface), position, arrangement, and/or appearance of some interface elements to other interface elements. For example, if it is determined that a particular link on the interface links to relevant content, the link can appear to move more forward (e.g., appear taller) than the other interface elements. In another example, if it is determined that a particular article is relevant, the text of that article can be positioned and/or displayed in 3D space such that the text is the main focus of the interface, and is thus more readable due its relative size and position to the other elements. In this way, advertisements, images, links, article text or any interface element determined to be relevant to a user can be positioned "forward" or "backward" based on the determined relevance.

In various other embodiments, the page profile can include information indicative of the importance of the various interface elements, and this information can be used to determine the 3D appearance (e.g., height, locations, etc.) of the interface elements as the orientation of the device changes and/or the relative position of the user to the device in 3D space. For example, the appearance of the interface elements can be predetermined by a developer of the interface, provider of the device, or some other entity. For example, the developer or other entity can assign the elements different weights, where the weight is indicative of the elements relevancy, and the weight can be used to adjust at least one of a height, color, appearance for one or more of the elements. Accordingly, various embodiments enable interface elements (e.g., images, text, advertisements, etc.) to be highlighted in the renderings of those interfaces based at least in part on the weight of the element, such as by bringing an element "forward" toward the front of the display screen in a 3D display or quasi-three-dimensional rendering on a 2D display element based on an orientation of the computing device, as well as a position of the user's head or eyes. In various instances, the weights can be based on a number of clicks received, the amount of interaction with the element by the user, etc. In this way, the interface elements can dynamically change, where the height of any interface element can be based at least in part on interest in the particular interface element. For example, interface elements that receive more clicks than other interface elements can appear taller than other interface elements.

In certain embodiments, the page profile, a system profile, an action profile, or any repository of information can include information configured to identify interface elements of a certain type (e.g., a phone number, an email address, etc.), where based on the type of element, a 3D appearance of a respective element can be altered (e.g., the element can appear to be closer to a surface of the display screen of the device, the element can be emphasized, etc.) and one or more actions can occur when selecting or otherwise interacting with the element. In accordance with various embodiments, elements can include phone numbers, addresses, URLs, images, contact information, dates, event information, etc. Actions can include causing the device to open a phone application and dial the phone number, causing the device to open a navigation application and provide directions to the address, causing the device to open an address book to save the address, causing the device to open a web browser to navigate to a webpage indicated by the URL, causing the device to open a photo album to save an image, causing the device to open an address book to save the contact information, etc. In some situations, the user can "peek" at the identified element, e.g., a phone number, and can see additional information such as an address associated with the phone number or picture of an owner of the phone number displayed on a side of the 3D representation of the phone number. Various other elements (and associated actions and related information) can be displayed and it should be noted that the examples provided are not to be taken as limiting.

Figure 3B:
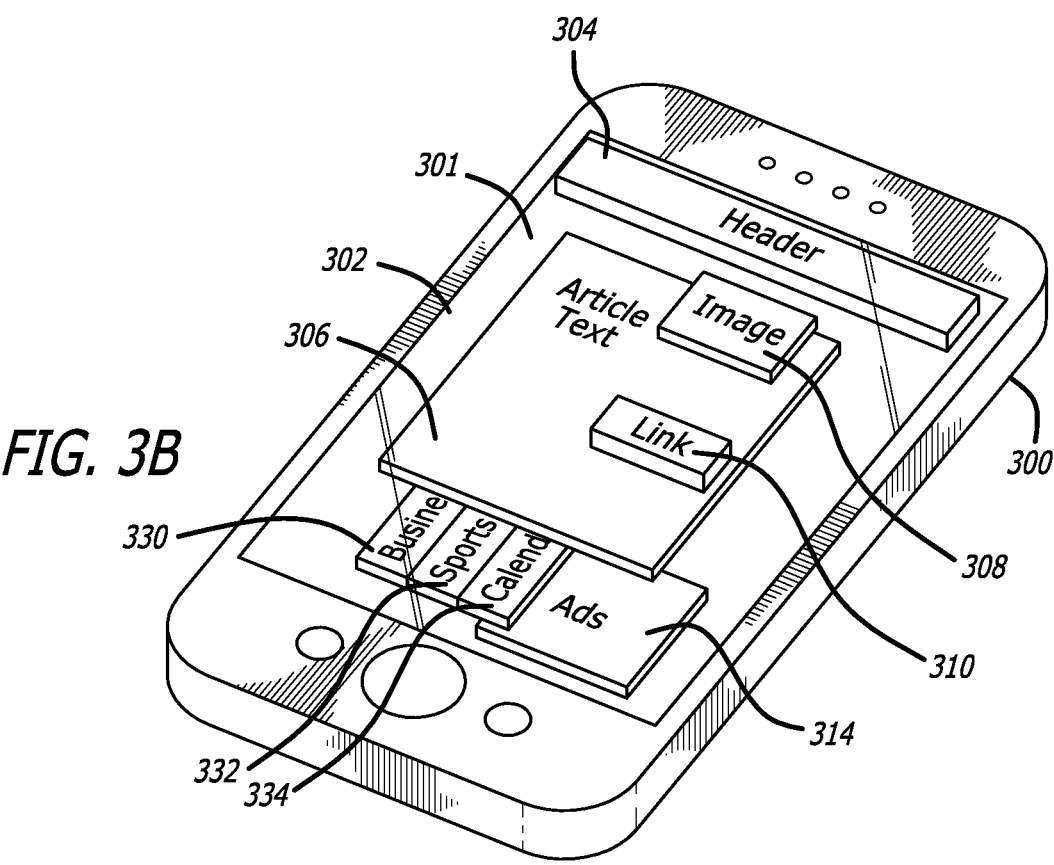

As described, the rendering of the interface elements can change as the orientation of the device is changed. This can include tilting, rotating, or otherwise changing a position of the device. FIG. 3(b) illustrates a stacked arrangement of interface elements. In this example, the computing device 300 has been tilted or rotated, where such a change can cause the device to alter the appearance of the interface. In this example, upon detecting a change in orientation of the computing device 300, the interface 301 is rendered such that the interface elements are divided into a stack-like arrangement, where the interface elements appear to be stacked or otherwise arranged on top of each other. It should be noted other input can be used to cause the device to alter the appearance of the interface elements. Such inputs can include voice, touch, and/or gesture input. For example, the user can make a motion or gesture in the field of view of the device that can cause the device to alter an appearance of the displayed interface elements. Other information can be used as well, such as a detection of the user holding, contacting, or squeezing the device. For example, the article text 306 element can be stacked on a link element for the business section 330, a link element to for the sports section 332, and a link element for the calendar section 334. In various embodiments, the appearance of the interface elements, such as the position, arrangement, and/or depth, etc., can be determined based at least in part on the importance or relevancy of the interface elements to the user, as set by the author/developer of the page, and/or a combination of the two. In various embodiments, the device can adjust the appearance of shadows associated with the relevant interface elements to make those elements appear to be higher in the interface, as well as to give a 3D appearance as each shadow can move in position relative to an associated element as the point of view changes, for example, to give the impression of an actual shadow being case by the relevant element. Further, the interface can render sidewalls or other elements that appear to provide a depth of the interface element from the point of view of the user, and the extent and shape of these elements can adjust with changes in point of view, as well as an orientation of the device. Various other behaviors can be used as well to mimic 3D behavior as well as an appearance of stacked interface elements. In this example, advertisements are rendered on the lower level with no shadow, and are positioned under links 330, 332, and 334 to give the interface element the appearance of being at a lower z-depth. In at least some interfaces, there might be more than three levels, and the amount of shadowing, color adjusting, and other such aspects can depend at least in part upon the level with which the element is associated.

As described, the type of content displayed and/or arrangement of the content can be determined based at least in part on a user profile of the user. As described, the user profile can include information such as a user's browsing history or other user-based preference information. In this way, when the device is operating in a 3D view mode, content determined to be relevant to the user can be highlighted or otherwise displayed more prominently than other content. For example, based on the information in a user's user profile, links to the business section, sports section, and calendar section can be displayed because it has been determined that the user often visits these sections.

Figures 4A, 4B:
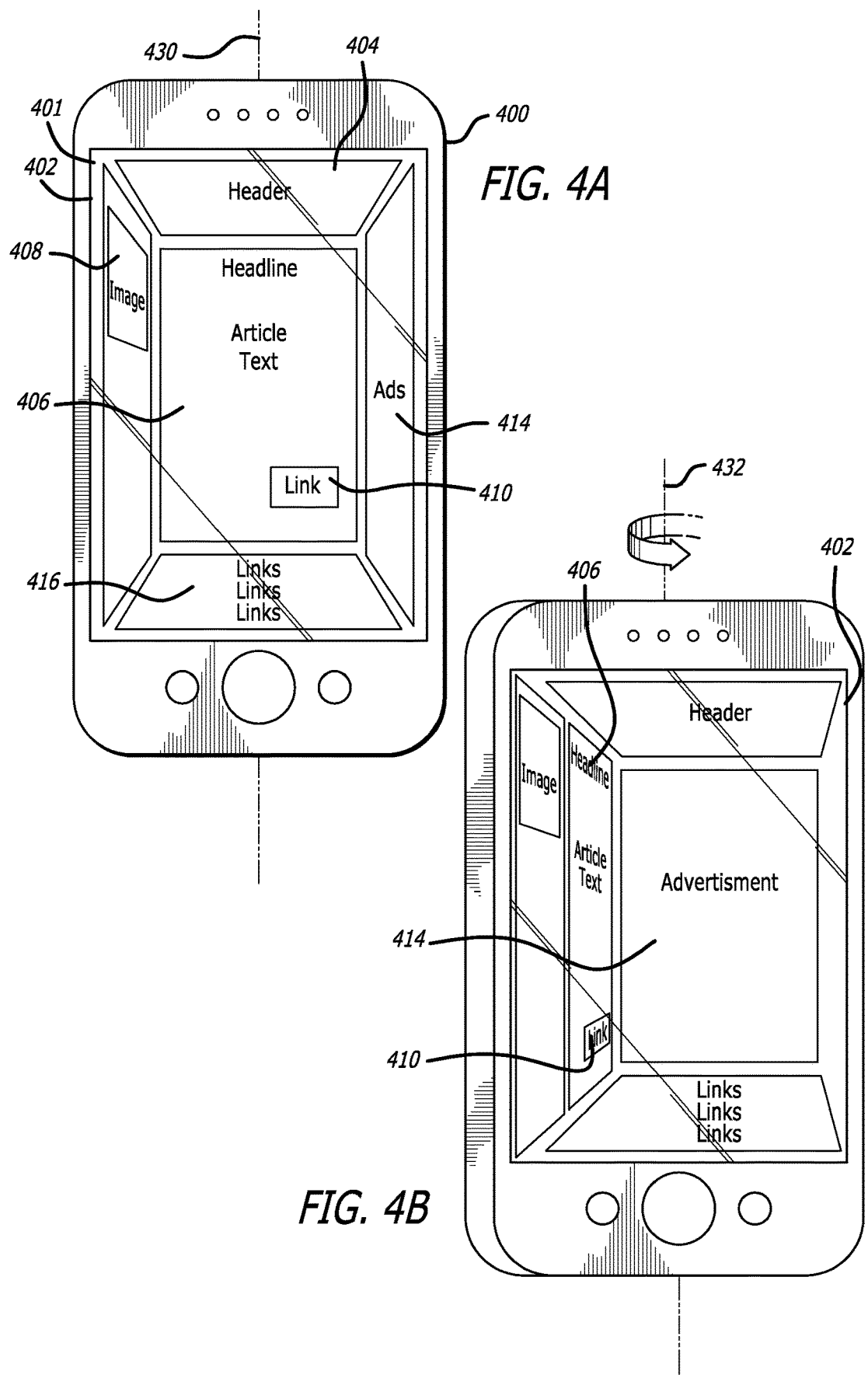
FIGS. 4(a) and 4(b) illustrate a various states of an interface that can be rendered in accordance with various alternate embodiments.

In various situations, in can be useful to change how content is displayed, such as to improve readability, appearance, and/or access to the content. For example, in some situations it may be useful to display content within a 3D shape, such as a cube, where content can be displayed on the walls of the 3D shape and the user can navigate between the content displayed on the different walls. For example, as shown in FIG. 4(a), upon detecting an activation of a 3D view mode, an interface 401 displayed on a display screen 402 of a computing device 400 can be rendered to display page content zones separated onto different walls of a 3D shape. A page content zone can be any one of the walls (or a portion of a wall) of the 3D shape. The user can move the content in 3D space to view the content of any one of the walls, where the content displayed for a respective wall can include one or more interface elements. As described, the interface elements can include a page header 404, article text 406, at least one image 408, at least one link 410, advertisements 414, and other various other links 416, among others. It should be noted that although a cube is shown, the content can be rendered on the sides or walls of any 3D shape.

As a user of the computing device tilts, rotates, translates, flicks, or otherwise changes a relative orientation of the device, the display of the content can be adjusted to provide a view of a different one of the walls. For example, when the user rotates the device counterclockwise 432 around an axis 430 of the device, the rotation of the device can cause the content displayed to shift accordingly (e.g., counterclockwise). In this way, the user can focus on one wall or surface at a time and can shift the content into focus with movement of the device. It should be noted that other input can be used to cause the device to alter the appearance of the interface elements. For example, the user can make a counterclockwise motion or gesture in the field of view of the device that can cause the content displayed to shift accordingly (e.g., counterclockwise). As shown in FIG. 4(b), rotating the device counterclockwise (or e.g., performing a counterclockwise gesture) can cause a corresponding rotation of the interface elements, where the advertisements 414, article text 406, and link 410 rotate about the interface in a counterclockwise direction. In accordance with various embodiments, a rotation of the device can cause any number of changes in the orientation and/or appearance of the interface elements. For example, a rotation of the device or other change in orientation can cause the device to enter a reading mode or other similar mode. In such a mode, the device can cause the interface to focus on the most important consumable part of the page, e.g., an image, text, etc., by centering such content in the center of the page and the other content can be moved to the edges of the display screen.

In various embodiments, the device can use information such as the field of view of the camera, as well as the position of the user's head or eyes to determine a current point of view of a user, and the point of view can be used to render an interface on a display screen or other such element of the computing device. The rendering can update as the determined point of view changes as a result of movement of the user and/or the computing device. The rendering can utilize 3D mapping information, such as a set of layer depths or z-levels, to determine how to relate various interface elements to each other.

Figure 5A:
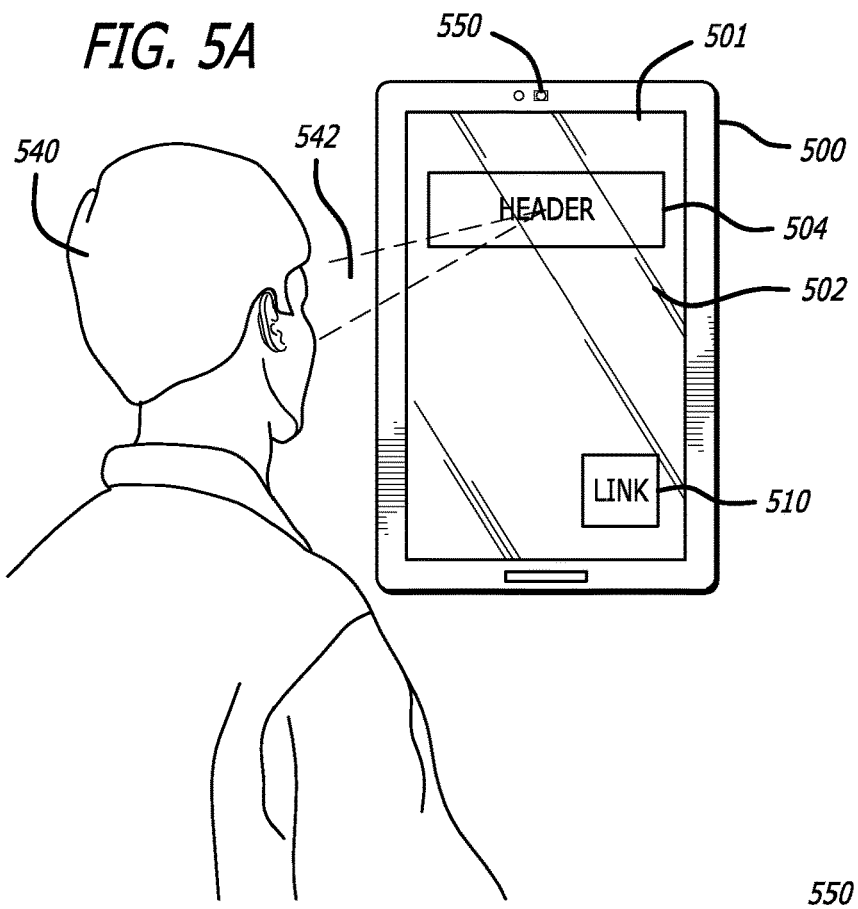
FIGS. 5(a) and 5(b) illustrate a various states of an interface that can be rendered in accordance with various alternate embodiments.
Figure 5B:
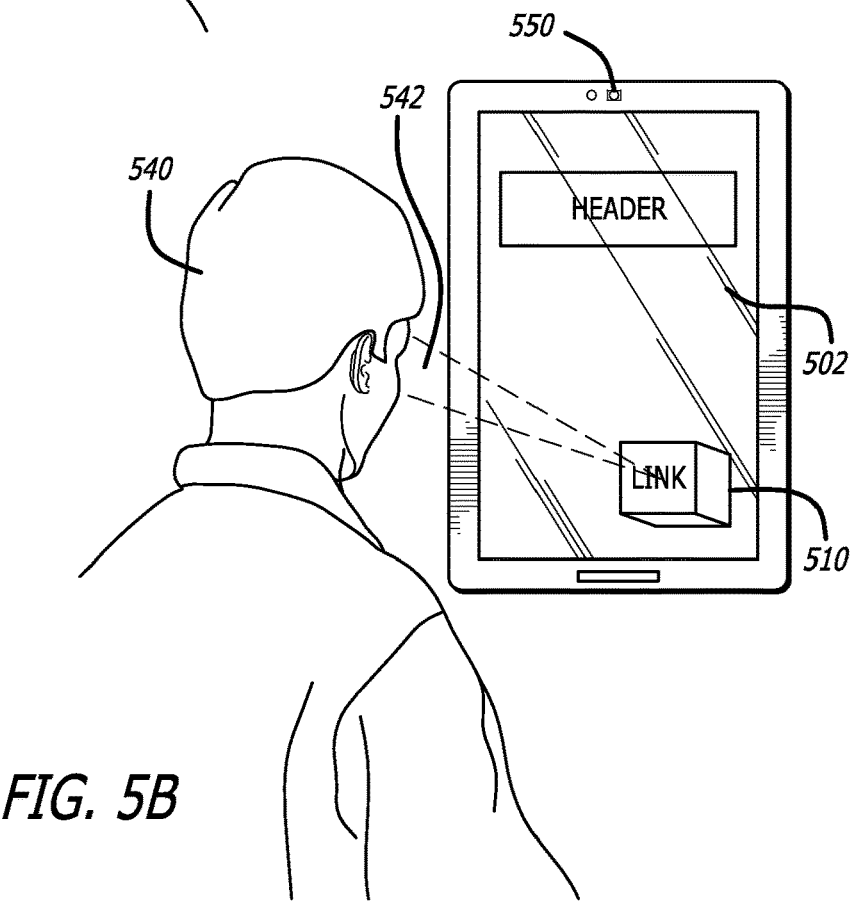

For example, FIG. 5(a) illustrates an example interface displayed on a display screen 502 of a computing device 500. In this example, a user 540 is viewing a conventional 2D representation of a webpage 501. As with many conventional webpages, the areas of the webpage can be divided into zones or areas. In this example, the webpage includes a header 504 and at least one link 510. The device can further include at least one camera 550 configured to capture one or more images in the camera's field of view 542, such as an image of the user. The image of the user can be processed using one or more facial and/or gaze tracking algorithms to determine a viewing or gaze direction of the user with respect to the device. The gaze direction can be used to determine an area, interface object, or other portion of the display screen of the computing device the user may be viewing. Accordingly, the rendering of the interface elements can change as the relative gaze direction of the user changes with respect to the device. For example, as shown in FIG. 5(b), the user's gaze has changed from being substantial aimed at the header 504 to being substantially aimed at the link interface icon 510. In accordance with various embodiments, a change in viewing direction can cause the device to modify an appearance of an interface element. For example, the change in the user's gaze direction can be indicative of important content or area of the display screen that the user may want to view. As such, approaches in accordance with various embodiments can provide for activating a 3D view mode based on a change in gazing direction of the user. Accordingly, as the user "peeks" or otherwise looks around the device, interface elements, content, or other areas of the device determined to be in the gaze direction of the user can be altered such as to render a 3D representation of the interface element to allow for display of additional information and/or content on the edges and/or sides of the 3D representation of the interface element. In this way, as the user peeks around the display screen to view certain content, the content can be highlighted, emphasized, or otherwise modified to improve readability of such content or provide additional information related to the content.

Figure 6A:
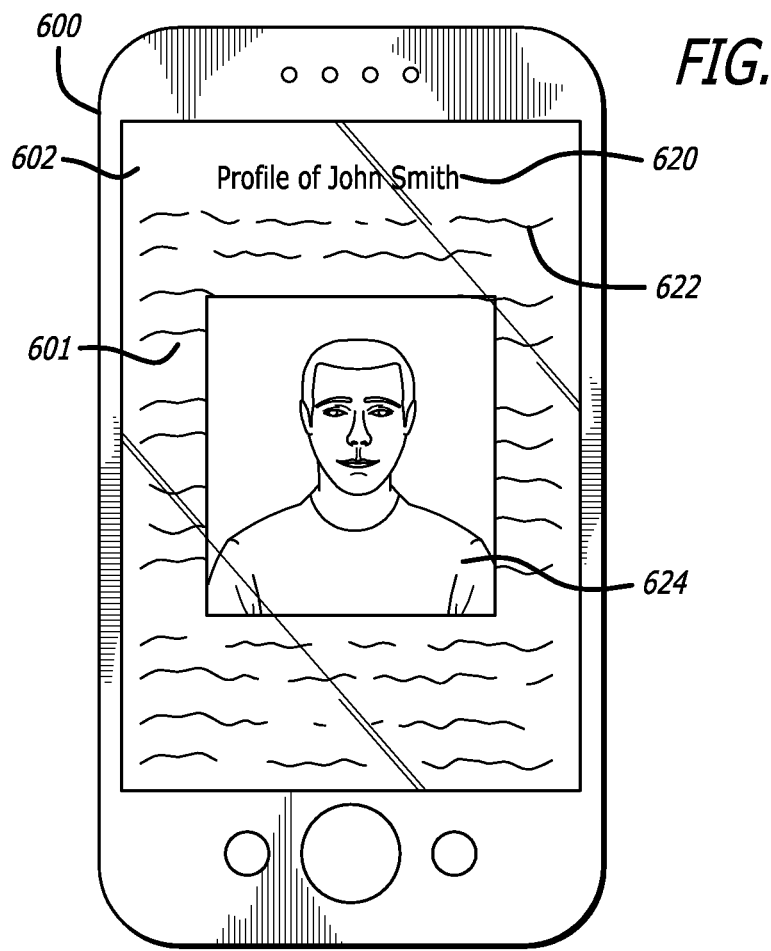
FIGS. 6(a), 6(b), 6(c), and 6(d) illustrate a various states of an interface that can be rendered in accordance with various alternate embodiments.
Figure 6B:
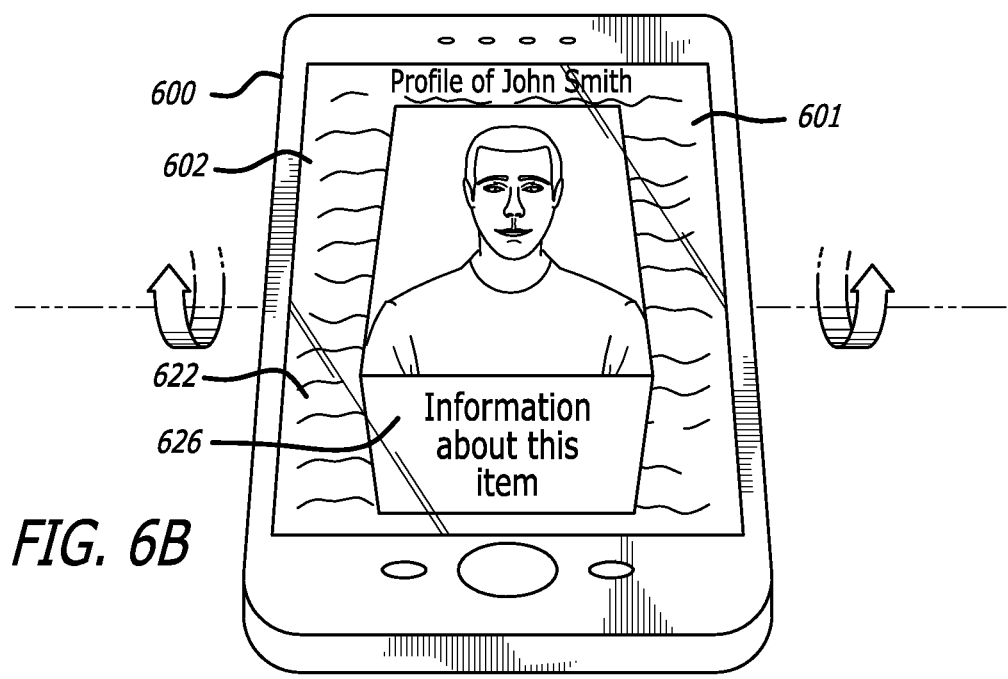

For example, FIGS. 6(a) and 6(b) illustrate a situation where 2D interface elements or other 2D content displayed on an interface of a computing device is transformed into a 3D interface element capable of displaying additional content and/or information. As described, the device can transform the content in response to the device entering a 3D view mode. The 3D view mode can be activated in response to a number of different 3D view mode activation events. For example, the 3D view mode can be activated in response to detecting a change in orientation of the device, such as a tilt, rotation, shake, etc. In some situations the orientation shift used to activate the 3D view mode can be predetermined while in various embodiments a user can set or otherwise program the device to recognize a personalized orientation shift as an action to activate the 3D view mode. Various other approaches can be used as well to activate the 3D view mode. For example, the 3D view mode can be activated through a touch input, where a user can select, touch, or otherwise interact with a physical and/or a user-selectable interface element to activate the 3D view mode. In various other embodiments, the 3D view mode can be activated through voice and/or gesture input. In some embodiments, the 3D view mode can be activated when the device detects one or more external sources (e.g., a 3D view mode activation signal, wireless siganls, etc.). For example, when the device is within proximity to one of the external sources, the device can cause the 3D view mode to be activated. Example external sources can include wireless networks, peer-to-peer networks, telephone networks, RFID signals, mobile devices or other computing devices, etc.

In response to a change in orientation of the device or a change in a user's gaze direction relative to the device. FIG. 6(a) illustrates a 2D interface of a profile view 620 of a person. The profile view can be displayed on a display screen 602 of a computing device 600. An interface 601, webpage, or other content page can display at least an image 624 of the person in the profile and information 622 about the person. In this example, a 3D view mode can be activated due to a change in an orientation of the device. For example, the device is titled away from the user (i.e., the top of the device moves away from the user and the bottom of the device moves towards the user). As mentioned, when the device operates in a 3D view mode, the device can alter the rendering of an interface such as to illustrate a 3D representation of the interface. For example, as shown in FIG. 6(b), a 3D representation of the image 624 of the person can be rendered upon detecting the change in orientation of the device. In various embodiments, in addition to the appearance and/or arrangement of content, additional content can be provided. The additional content can be displayed along the 3D interface elements, such as on a side or edge of the element, where the additional content can include text, images, links, or other information. In various embodiments, in addition to the appearance and/or arrangement of content, additional content related to and/or otherwise determined to be interesting or useful can be provided. The additional content can be displayed along the 3D interface elements, such as on a side or edge of the element, where the additional content can include text, images, links, or other information.

Figure 6C:
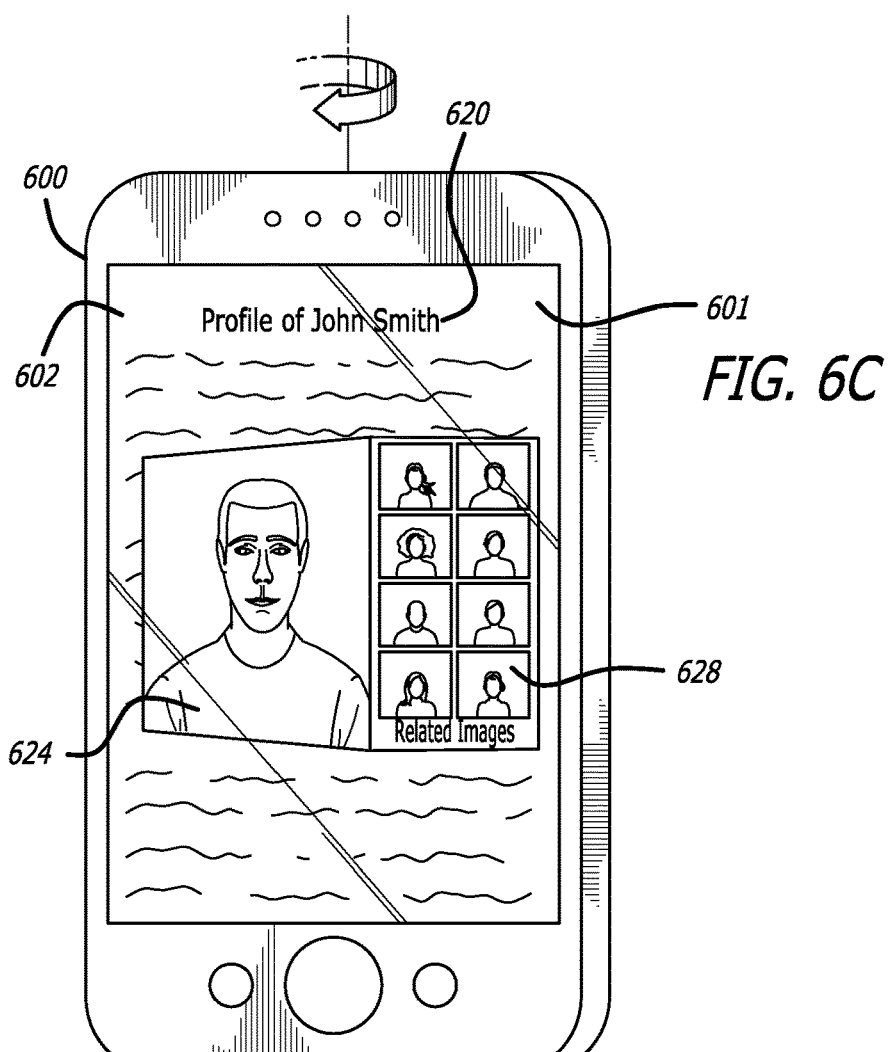
Figure 6D:
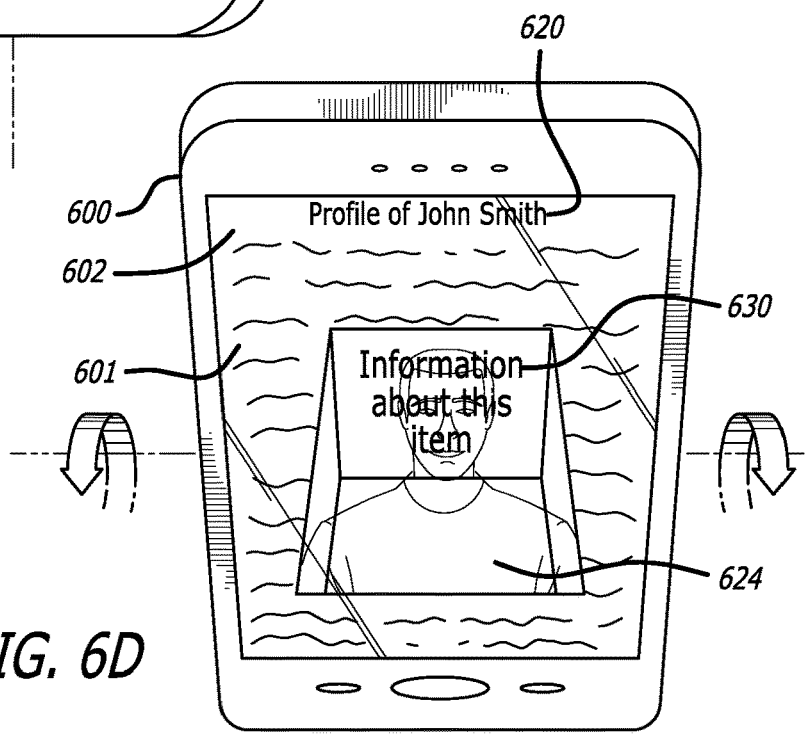

For example, rendered on at least one side of the 3D representation of the device can be information 626 related to the person. The related information can include links to other pages, information related to the profile, images related to the profile, or any other type of information. If the user wanted to view content on a different side of the interface element, the user could tilt or rotate the device to cause a view of the interface element to change to show a different side of the element. As shown in FIG. 6(c), in response to titling the device, a different side of the interface element can be caused to be displayed. In this example, the exposed side of the interface element can include information, such as a set of related images 628 that are related to the profile image 624. Further rotation and/or tilting of the device can cause additional sides of the interface object to be displayed, where each side can include information and/or content. As shown in FIG. 6(d), the user has titled the device towards the user to "peek" into the interface element. In such a situation, information 628 related to the profile of the person can be rendered inside the 3D interface element. As described, the information can include information related to the profile and/or other information such information. It should be noted that the interface object can include any number of sides, edges, or surfaces, and the different surfaces can have rendered thereon information of any type.

As described, in various situations, in can be useful to change how content is displayed, such as to improve readability, appearance, and/or access to the content. For example, in various embodiments, interface elements and/or other content can be presented on a single page and the user can navigate from one page to another by selecting a link (e.g., an element, an object, or a number that indicates a page of content in a series of pages of content) that loads a page associated with the link. For example, as shown in FIG. 7(a), an image 708 of an elephant is displayed on an interface 701 (e.g., a webpage) rendered on a display screen 702 of the computing device 700. In this example, a user can navigate to different pages of the webpage by selecting navigation links or elements 750,752. For example, the user can navigate to a second page of the webpage by selecting navigation link 750. Alternatively, the user can navigate to a third page of the webpage by selecting navigation link 752. In at least some embodiments, the user can activate a 3D view mode to alter the rendering of the image such as to render a 3D representation of the image. The 3D view mode can also alter the way in which the user interacts with the content. As described, the 3D view mode can be activated by tilting the device, for example, as shown in FIG. 7(b). In this example, the related pages are displayed as a stacked arrangement of pages. This provides for a visual representation of the linked pages. The user may further "peek" at the pages as shown in FIG. 7(c), such as by titling the device, which can cause the pages to stack such that the user is presented with at least a partial view of the pages. Other arrangements are also possible, such as an arrangement where the pages are stacked or arranged to allow for at least a partial view of the content on those pages. The user can interact with the pages, such as through touch input or gesture input to cause the device to navigate to the selected page. For example, the user can "tap" of otherwise select the desired page, and upon selecting the page the device can cause the respective page to load.

Figure 8A:
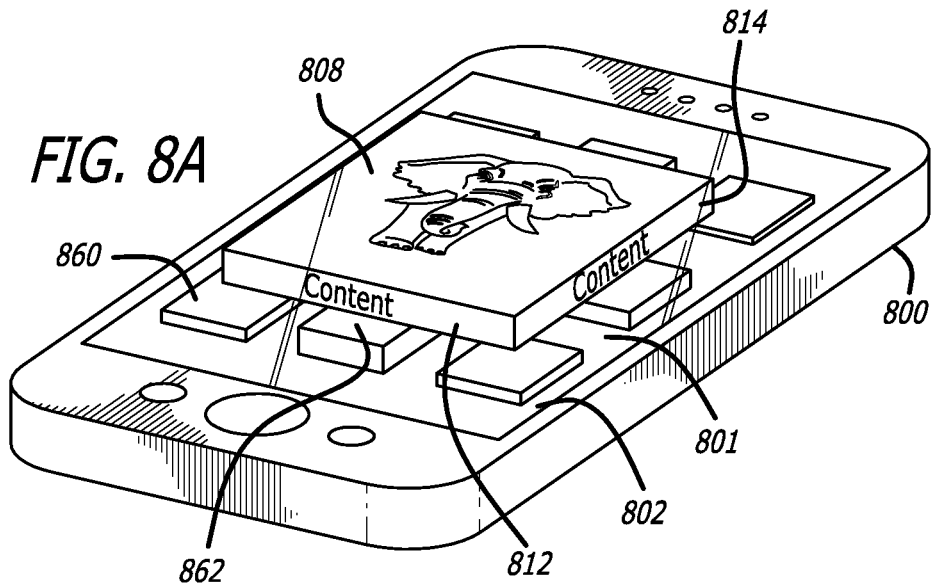
FIGS. 8(a) and 8(b) illustrate a various states of an interface that can be rendered in accordance with various alternate embodiments.
Figure 8B:
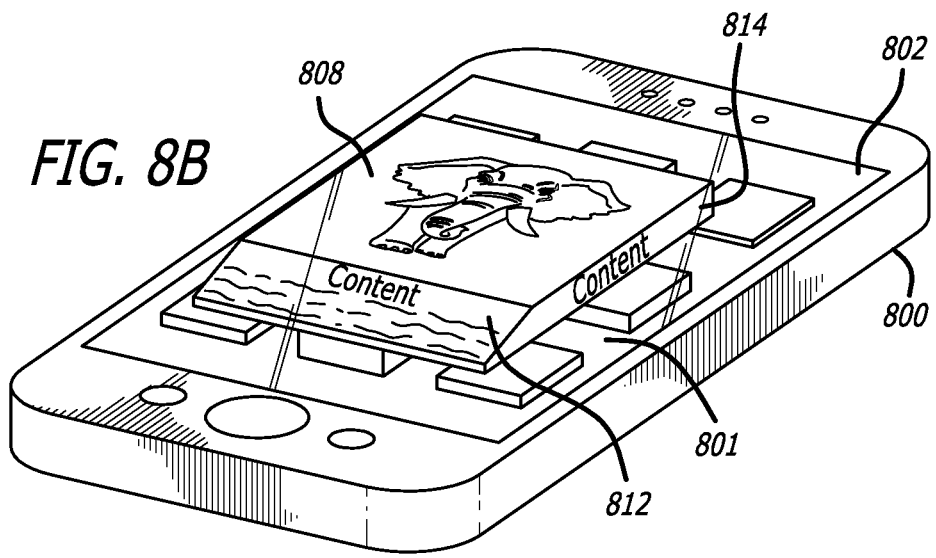

In various embodiments, the interface element can display additional content or information on its edges or sides or other face of the element. For example, as shown in FIG. 8(a), a display screen 802 of a computing device 800 can display at least one interface object 808 on an interface 801. In this example, the interface object is an image of an elephant. The image presented can be the result of an image search for elephants or an image from an article or other page. In this example, the position of the 3D representation of the elephant can be adjusted to visually indicate an importance or relevancy of the displayed image. For example, the 3D representation can appear to "float" or otherwise be positioned above other interface objects, indicating that the image may be more important or relevant than the other images. In this example, the other interface elements 860, 862 can be related images from the image search query or content related and/or otherwise associated with the interface object. In various embodiments, the sides or edges of the content can alter in appearance to display additional information about the elephant. For example, in response to the user selecting the elephant, the sides and/or edges can change in shape to allow for the display of additional information. As shown in FIG. 8(b), side 812 appears to slope down further over interface elements 860 and 862 to accommodate additional content. The sides and/or edges can further be altered by adjusting a height, shape, color, etc. of the edges and/or sides of the 3D representation of the elephant.

Figure 9A:
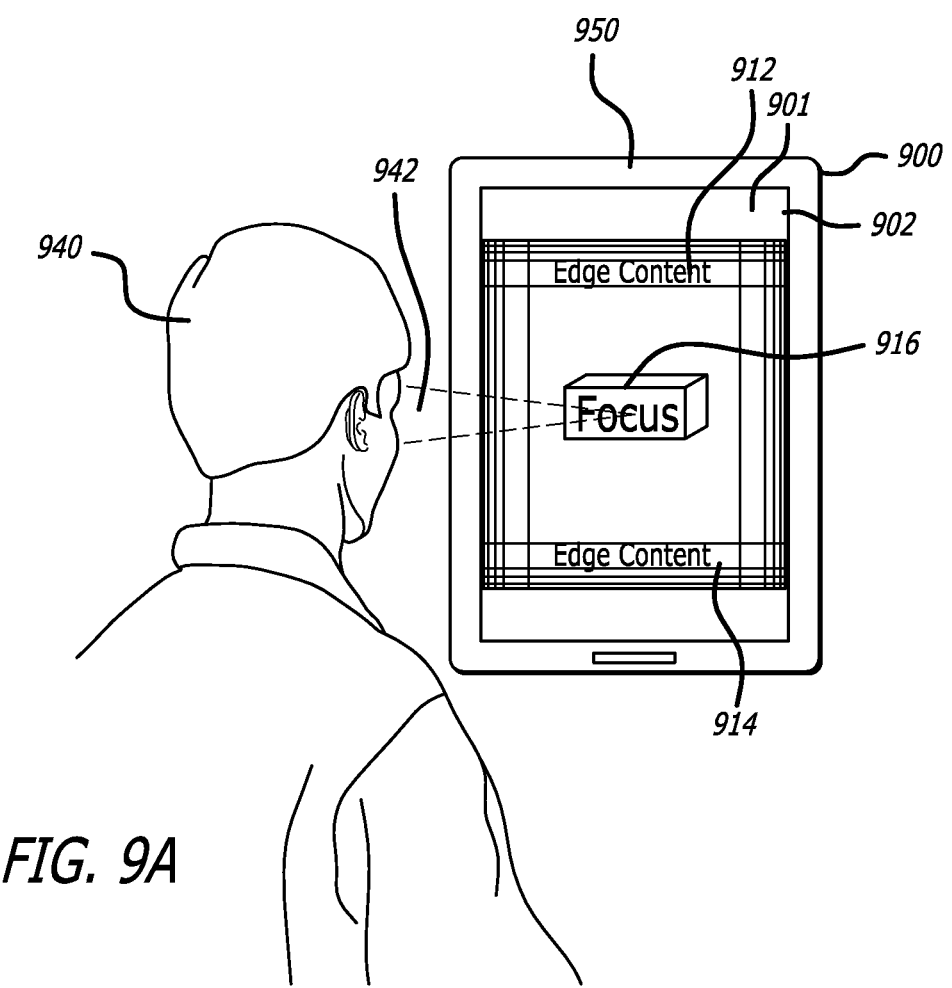
FIGS. 9(a), 9(b) and 9(c) illustrate a various states of an interface that can be rendered in accordance with various alternate embodiments.

As described, the direction of a user's gaze can be used to determine an area of an interface, an interface element, or other portion of the display screen of the computing device the user may be viewing, and when a 3D view mode is activated, the appearance of the area of the webpage or application the user is looking at can be altered. For example, FIG. 9(a) illustrates an example interface display on a display screen 902 of a computing device 900. In this example, the device can include at least one camera 950 configured to capture one or more images in the camera's field of view 942, such as an image of the user. The image of the user can be processed using one or more facial and/or gaze tracking algorithms to determine a viewing or gaze direction of the user with respect to the device. The gaze direction can be used to determine an area, interface object, or other portion of the display screen of the computing device the user may be viewing. In accordance with various embodiments, the rendering of the interface elements can change as the relative gaze direction of the user changes with respect to the device. For example, when viewing a conventional webpage, the content the user is viewing is at the same zoom amount as other content on the webpage, such as content on the periphery that may not be as important. In accordance with various embodiments, the content the user is looking at can be altered to be larger than the surrounding content, as if a magnifying glass was used to look at the content. In this way, content can enlarge as the user looks at that content. Thus, some areas of the webpage can appear to enlarge while others areas of the content appear to shrink. The content can enlarge and shrink at different and independent rates. This advantageously allows for global and local views of content concurrently.

Figure 9B:
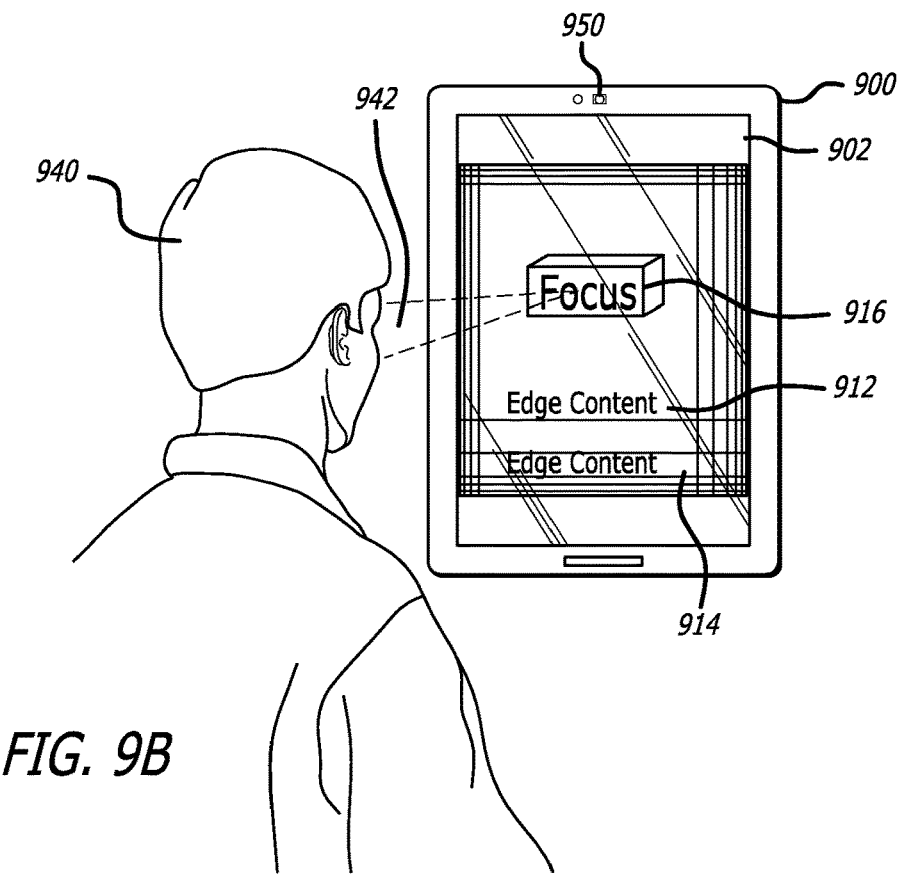
Figure 9C:
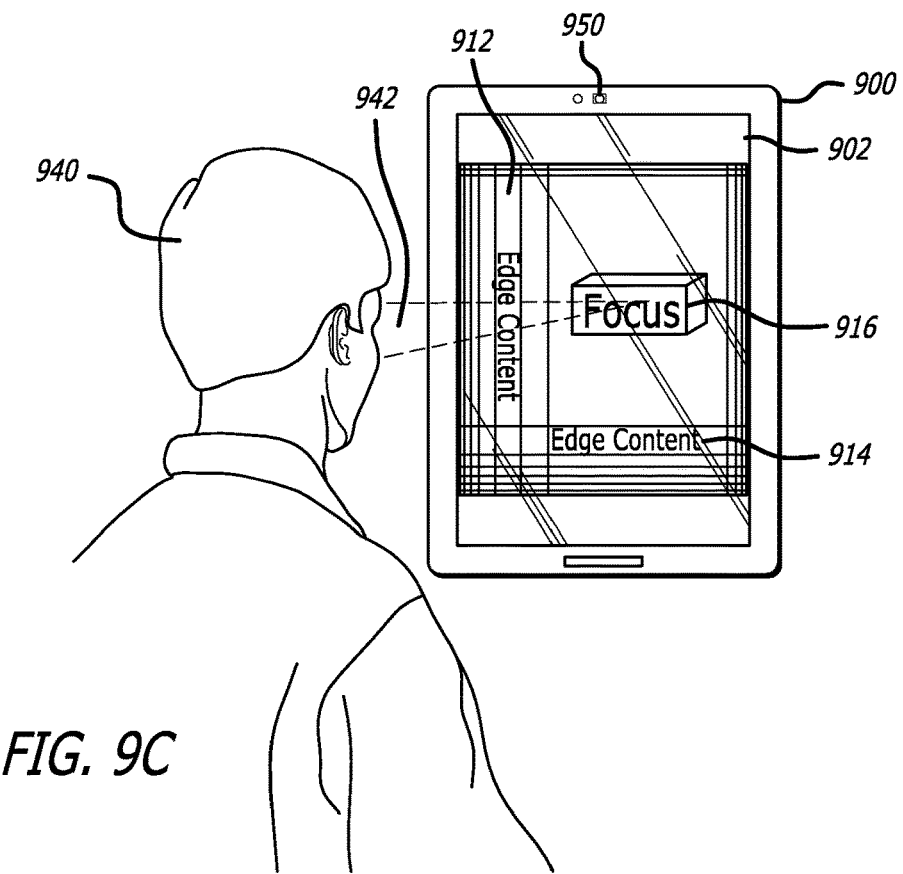

For example, as shown in FIG. 9(a), the user is focusing their gaze on an area 916 of the webpage, and the area of focus appears enlarged compared to other areas of the webpage, such as the edges of the webpage 912 and 914. The edges of the webpage can be other content on the webpage, related content to the area of focus, and/or any other content. The user can navigate the webpage by changing the focus of their gaze, and as the user changes their gaze, the content the user focuses on can enlarge or otherwise change in appearance to reflect that it is being focused on, while the other content can shrink. For example, as shown in FIG. 9(b), as the user's gaze shifts to the top of the page, the content at the top of the page can be enlarged or otherwise emphasized through shadowing, highlighting, animation, or some other change in appearance. Thus, in accordance with various embodiments, as the user "moves" (e.g., gazes around the page) between areas of interest the focused section can adjust in appearance such as by enlarging to maximize the content of the focus area. In this way, the user could navigate the page simply by changing the focus of their gaze, such as illustrated in FIG. 9(c). In this example, as the user's gaze shifts to the top left of the page, the content at this location is enlarged or is otherwise emphasized. It should be noted that the content can be emphasized in other ways, and enlarging the content is used to illustrate the general idea of altering an appearance of the content. For example, the emphasized content can curve, slope, or otherwise be warped around the displayed screen, such as by magnifying certain parts of the screen and not others. Other effects are also possible, such as changing the screen resolution of the area of focus, which can adjust the clarity, size, and amount of things that fit on the display screen.

In various embodiments, the device can display metadata associated with each object on a page whenever the device is titled, rotated, or when the device determines the user is gazing in a direction of the metadata. In this situation, an appearance of the interface element can stay the same and instead information associated with the element and/or the page is emphasized, highlighted or otherwise modified such as by increase a 3D depth and/or appearance of the information. For example, the information that is normally displayed in "hover" mode (e.g., when a cursor is over an object) may be one candidate for information that can be displayed when the device is operating in the 3D view mode. Other examples of metadata can include the last time the page was updated, links to an article being viewed, images that came from the article, related data, metadata about what is encompassed within the context of the page being viewed, etc.

Figure 10:
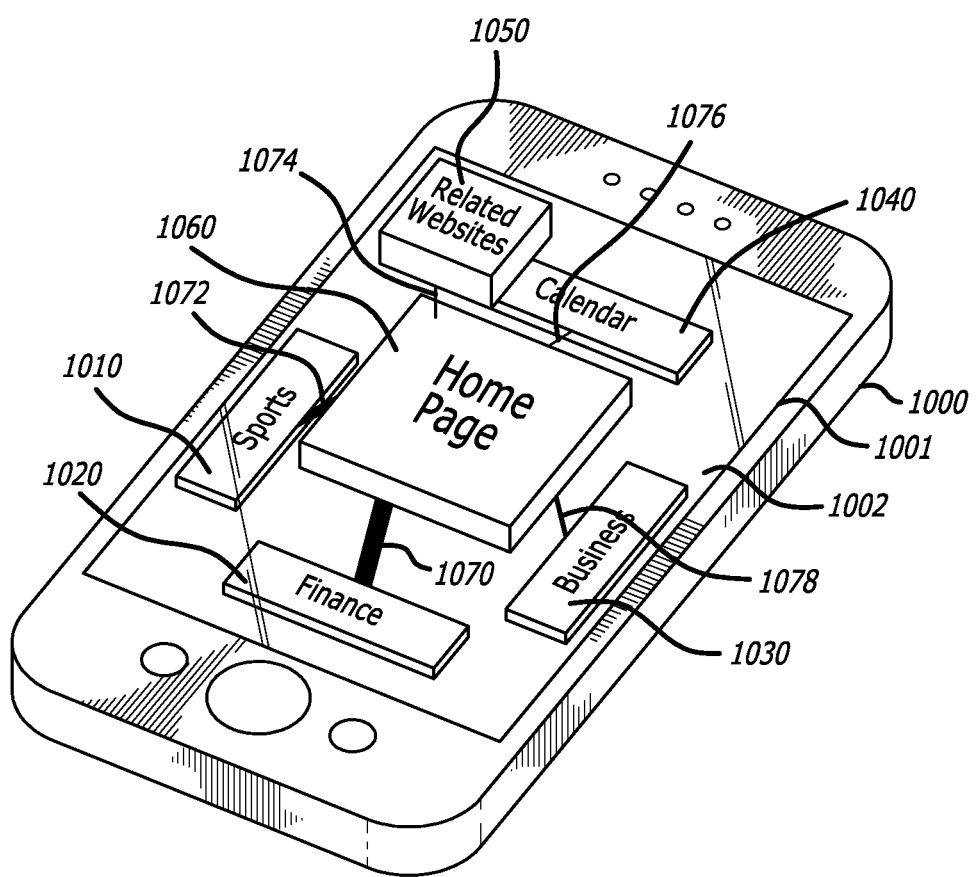
FIG. 10 illustrates a states of an interface that can be rendered in accordance with various alternate embodiments.

In at least some embodiments, the 3D view mode can be used to activate a 3D representation of a site map. For example, FIG. 10 illustrates an example interface 1002 on a display screen 1001 of a computing device 1000. In this example, the current webpage (e.g., home page) is reduced to a thumbnail sized interface element in response to moving the device in a particular orientation. For example, moving the device away from the user can cause a representation of the site map to be rendered. In this example, connected around the current page (e.g., homepage) are other interface elements that represent related pages, the flow of traffic, and/or the link connections between the homepage and its sibling pages, parent, or children pages. For example, as shown in FIG. 10, the homepage 1060 is connected to a sports page 1010, a finance page 1020, a business page 1030, a calendar page 1040, and a related webpage 1050. Connections between the pages can be represented by lines of various thicknesses (or weights), colors, etc. In accordance with various embodiments, the height of the thumbnails can be based on a likelihood the user may travel to that destination, where pages having content the user is most interested in can appear taller than pages the user is less interested in. The user's interest in any of the pages can be determined based at least in part on the browsing history or other profile data of the user. The thumbnails can be arranged in relative 3D space with the thumbnails determined to be more relevant or interesting being positioned closer to the user and thumbnails that the user is less likely to be interested in being positioned further away from the user. Shading, shadows, and various other visual characteristics can be used to render the appearance of depth, distance, and orientation. The amount of traffic to a particular thumbnail can be illustrated by adjusting the weight of the link to that thumbnail. For example, thumbnails (i.e., pages) receiving a lot of traffic can be weighted more heavily than pages receiving less traffic. The number of connections, thumbnails, related pages and other information can be based at least in part on how far in or out the user zoom's into the page. For example, in a zoomed out state, the relevant or main thumbnails are displayed along with the connections between the thumbnails. As the page is zoomed in, pages related to the thumbnails can be displayed, along with information associated with such pages and thumbnails such as a snapshot e.g., a current view) of the content on those pages.

Figure 11:
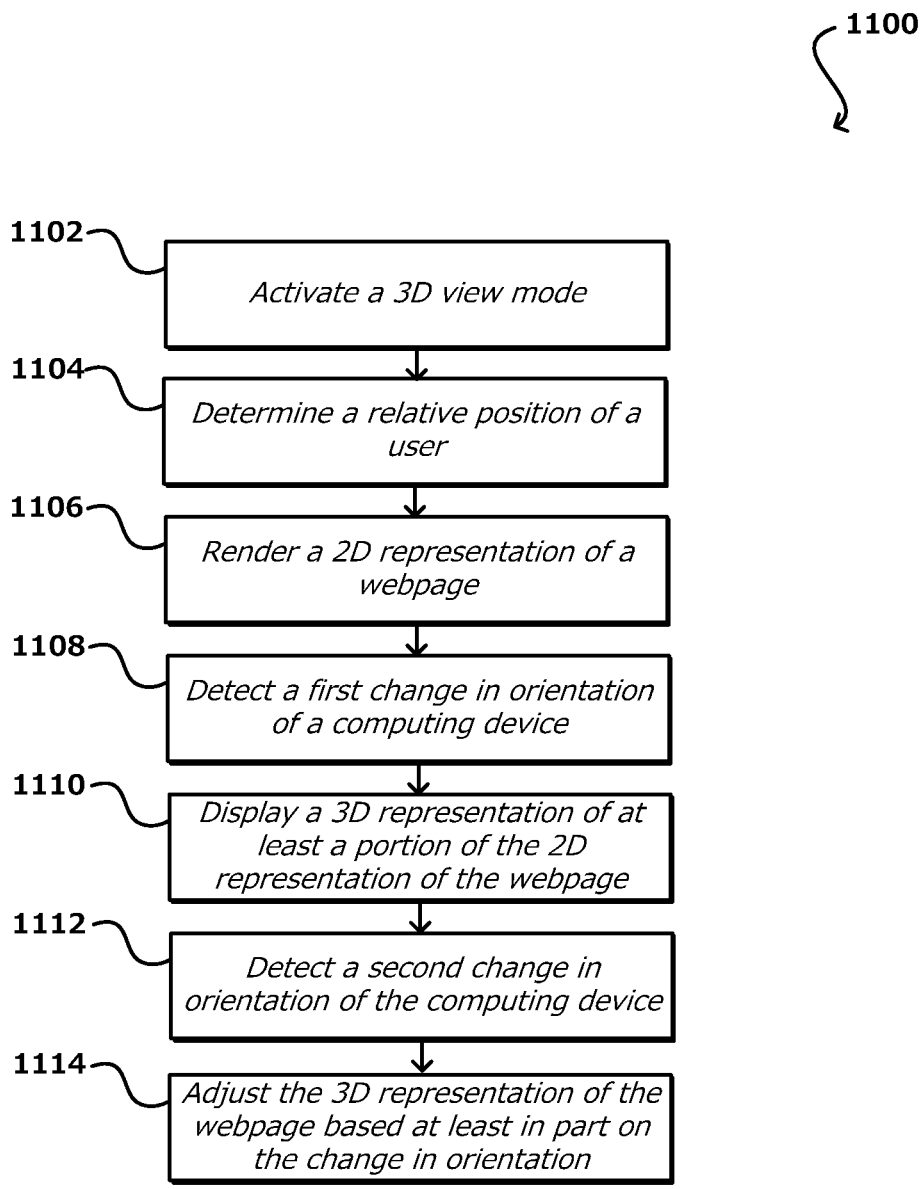
FIG. 11 illustrates an example process for rendering various interfaces in accordance with various embodiment.

FIG. 11 illustrates an example process for rendering various interfaces in accordance with various embodiments. It should be understood that, for any process discussed herein, there can be additional, fewer, or alternative steps performed in similar or alternative orders, or in parallel, within the scope of the various embodiments unless otherwise stated. In this example, a 3D view mode is activated 1102 on the computing device, which in this example includes enabling a 3D display and interaction with interfaces (such as a webpage, a content page, an application, etc.). For example, various embodiments enable interface elements to be highlighted, emphasized, animated, or otherwise altered in appearance and/or arrangement in the renderings of those interfaces based at least on an orientation of the device and/or user point of view of the user with respect to the device. In some embodiments, the 3D view mode can automatically be turned on whenever the computing device is active, even in a sleep mode or other such low power state. In other embodiments, the 3D view mode is activated automatically upon running an application or accessing an interface, or manually upon user selection. Various other activation events can be utilized as well.

The captured image information can be analyzed as discussed elsewhere herein to determine 1104 a relative position of a user's head (or other such feature) with respect to the computing device. As discussed, the initial relative position can be determined using the image information, and changes in that relative position can be determined using a combination of the image information and the motion sensor information. For example, the motion sensor data can be used to update the point of view until additional position determination information is available from the image data, whereby any necessary correction or adjustment to the determination can be made. For the current relative user point of view, the interface can be rendered 1106 such that a 2D representation of a webpage is displayed on a display screen of the device. As described, the webpage can include one or more interface elements, such as a header, article text, at least one image, at least one link, advertisements, and various other links. When a change in orientation of the device is detected 1108, a three-dimensional or multi-layer appearance, or other such aspect of at least a subset of the one or more interface elements is rendered 1110. This can include bringing an element "forward" in the rendering such that the element appears to be close to the surface of the display screen in a 3D display or quasi-three-dimensional rendering on a two-dimensional (2D) display screen. In accordance with various embodiments, bringing the element forward can involve, for example, adjusting a size, shape, shadowing, focus/blur, and/or coloring of the element. For example, interface elements can appear to be positioned and/or displayed in in 3D space such that that certain interface elements (e.g., text, images, etc.) become larger in 3D depth and/or appear closer to a surface of a display screen of the computing device, while other interface elements (e.g., advertisements) "fall back" or appear smaller in 3D depth. As the user tilts, rotates, or otherwise changes 1112 the orientation of the device, the interface elements can move back and forth or otherwise change shape or appearance 1114. When the input is completed, or the user otherwise finished with the 3D view mode, the elements can be moved "backwards" or otherwise be rendered in 2D, such as by performing an opposite or alternative adjustment to that which was performed when the element was shown to be active and the rendering process for that interface can end.

Further, in some embodiments the ability to make certain elements appear closer to the screen can be used for other purposes as well. For example, higher priority items (e.g., upcoming appointments or new messages) can be rendered at higher levels in the interface. Other approaches can be used as well, such as to bring unread messages to a higher level than read messages, new social network comments closer than old comments, etc. Various interface approaches can utilize aspects discussed and suggested herein as would be apparent to one of ordinary skill in the art in light of the teachings and suggestions contained herein.

Figure 12A:
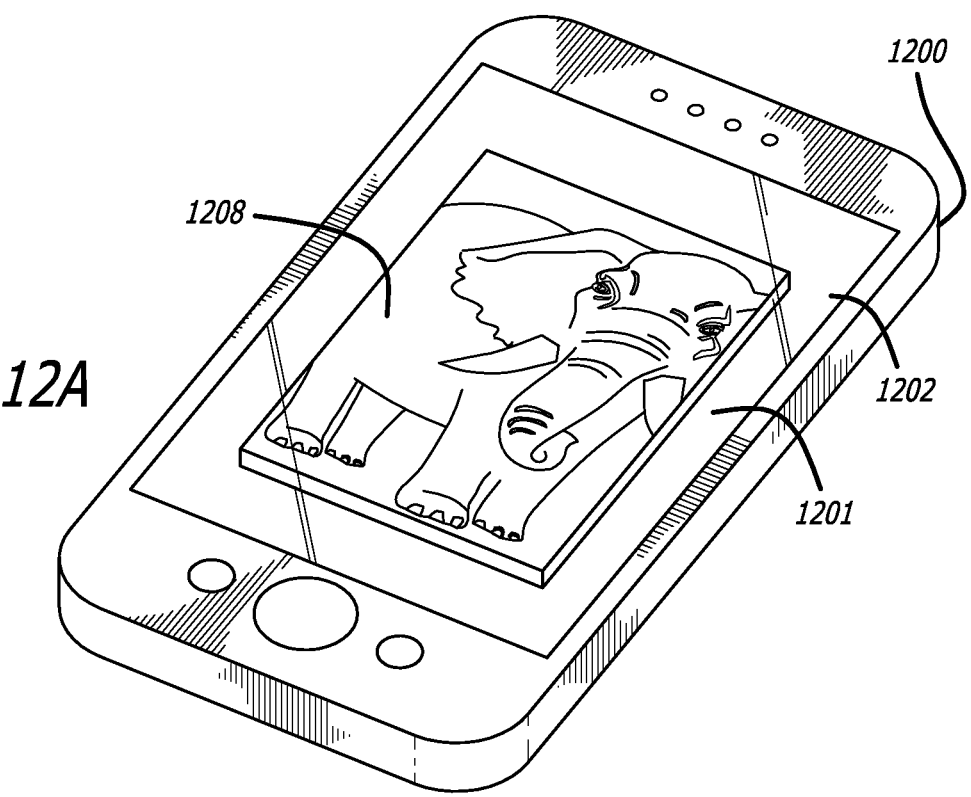
FIGS. 12(a), 12(b), 12(c), and 12(d) illustrate a various states of an interface that can be rendered in accordance with various alternate embodiments.
Figure 12B:
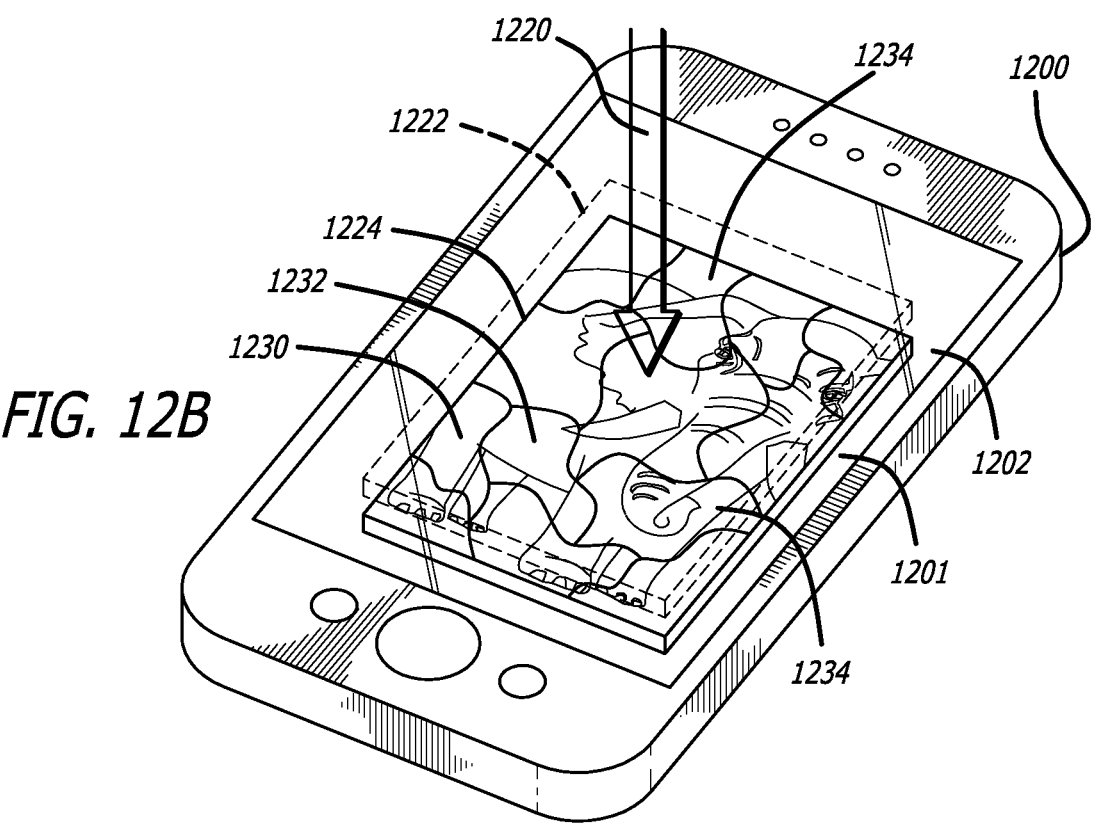
Figure 12C:
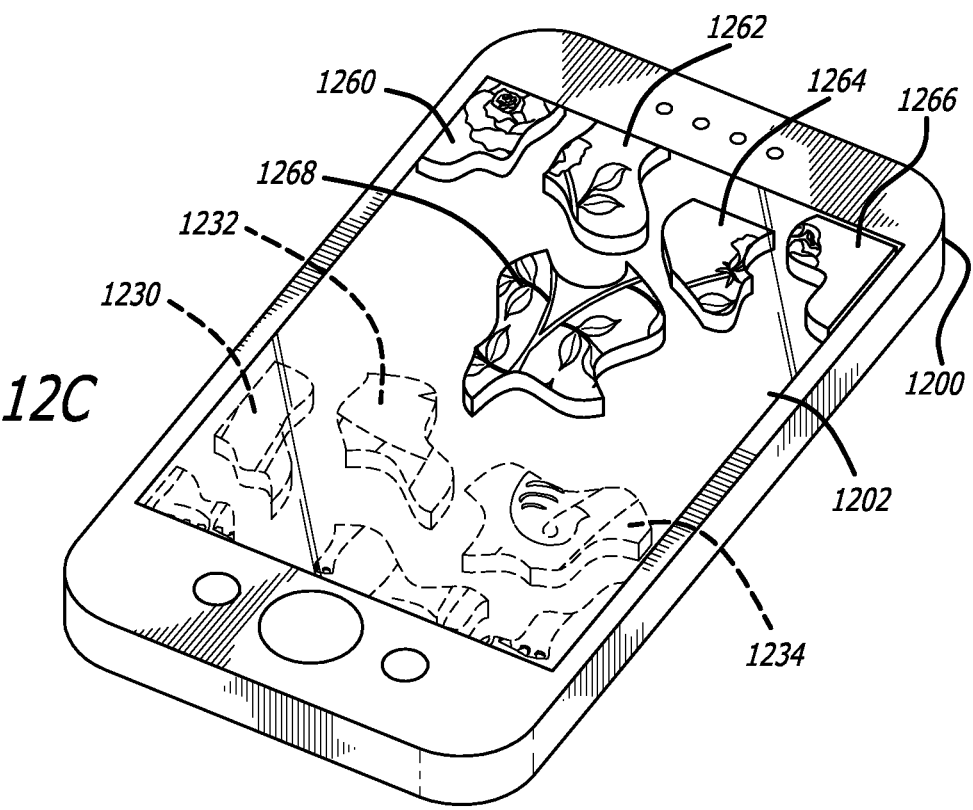
Figure 12D:
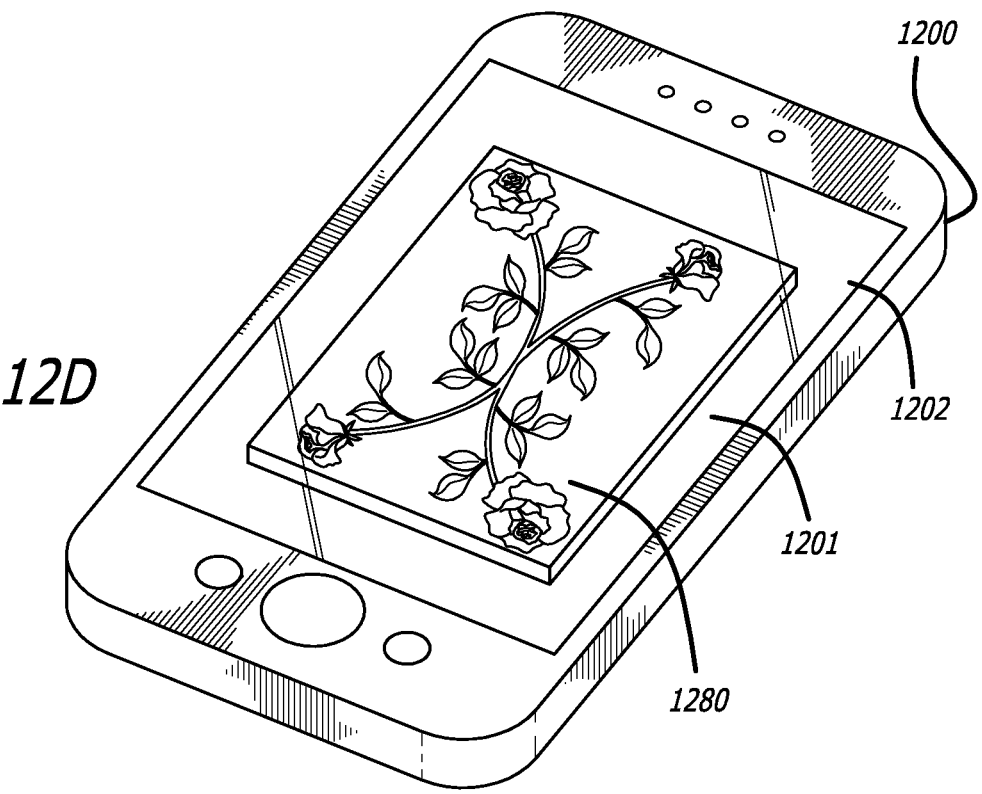

In accordance with various embodiments, when the user selects, clicks, or otherwise interacts with a link to navigate to another page, the device can cause to be animated a 3D departure of at least a subset of the interface elements from the 3D view of the first content page on the display screen. For example, FIG. 12(a) illustrates an example interface display 1201 on a display screen 1202 of a computing device 1200. Displayed on the display screen is a representation of the current page. In this example, the display is an image of an elephant. The animation of navigating from the current page to another page can include "dropping" 1220 in 3D space the page from a first height 1222 to a second height 1224. The page can separate into one or more sections, areas, segments, or interface elements (1230, 1232, 1234). Thereafter, at least a subset of the interface elements can be shown as traveling at different speeds, as illustrated in FIG. 12(c). Further, the interface elements can be shown as rotating, tilting, shaking, or being otherwise animated in a number of different ways as the interface elements exit the display screen of the computing device. The animation can further show a 3D appearance of one or more interface elements (1260, 1262, 1264, 1266, 1268) of a second page on the display screen. The interface elements of the second page can replace the interface elements of the first page until a rendering of the second page is complete, such as the rendering of the second page 1280 illustrated in FIG. 12(d). In some situations, an animation of the formation of the second page can include stitching, fusing, or otherwise bringing together the interface elements of the second page. Other animations are also possible. In certain embodiments, the speed of appearance or the duration of time at which the second set of content takes to load and render the second page can be based on network (e.g., data connection speed) speed. For example, in the situation where the device is connected to a fast network (e.g., a fast mobile or network data connection), the animation of the appearance can occur quickly since the amount of latency in navigating from a first page to a second page might be relatively short. In the situation where the device is connected to a slow network connection, the animation of the appearance of the second page can occur over a longer period of time since the amount of latency might be relatively longer. In any situation, such animation can advantageously be used to mask latency while loading content pages and can be used to modify or otherwise enhance the appearance and/or departure of a page.

Figure 13:
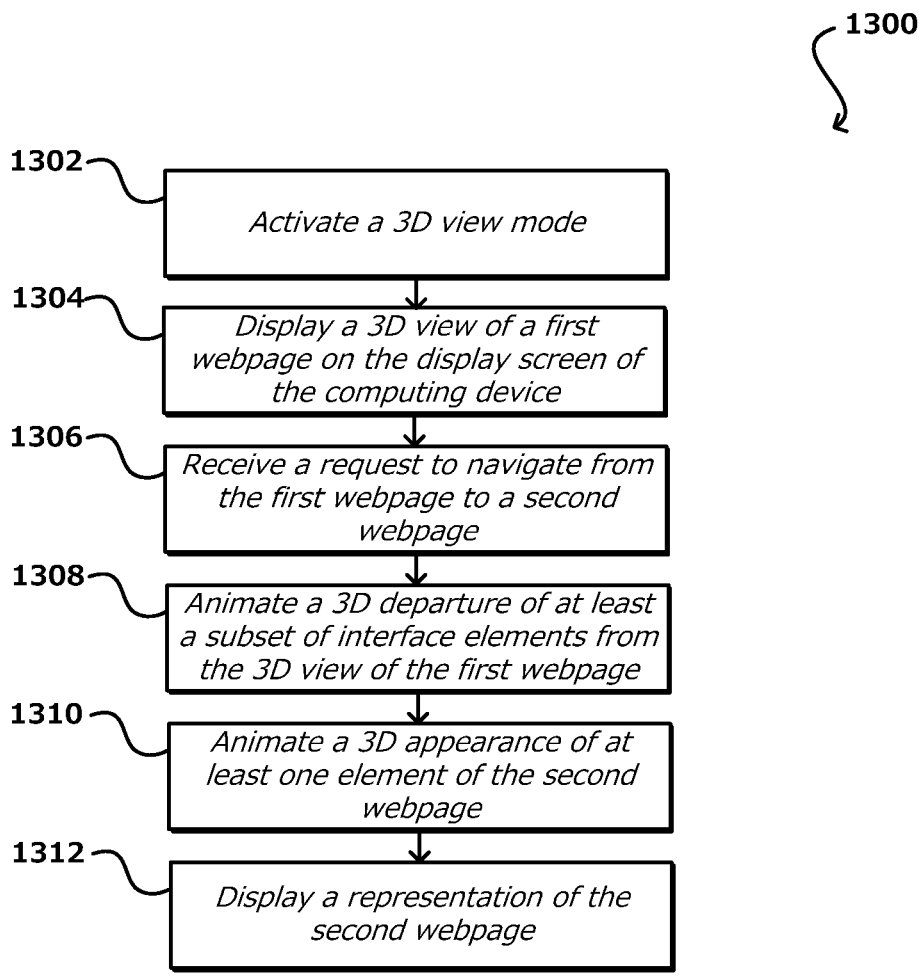
FIG. 13 illustrates an example process for rendering various interfaces in accordance with various embodiment.

FIG. 13 illustrates an example process for rendering various interfaces in accordance with various embodiments. In this example, a 3D view mode is activated 1302 on the computing device, which in this example enabling a 3D display and interaction with interfaces (such as a webpage, a content page, an application, etc.). As described, the 3D view mode can automatically be turned on whenever the computing device is active, even in a sleep mode or other such low power state. In other embodiments, the 3D view mode is activated automatically upon running an application or accessing an interface, or manually upon user selection. Various other activation events can be utilized as well. The 3D view mode can cause the device to display one or more interface elements in 3D space. For example, interface elements can appear to be positioned and/or displayed in 3D space such that certain interface elements (e.g., text, images, etc.) become larger in 3D depth and/or appear closer to a surface of a display screen of the computing device, while other interface elements (e.g., advertisements) "fall back" or appear smaller in 3D depth. As the user tilts, rotates, or otherwise changes the orientation of the device, the interface elements can move back and forth or otherwise change shape or appearance. In this example, a three-dimensional view of a first webpage is displayed 1304 on the display screen of the computing device. The first page can include a plurality of interface elements, such an images, text, advertisement, etc.

When a request is received 1306 to navigate from the first page (e.g., webpage) to a second page, the device can cause 1308 to be animated a 3D departure of at least a subset of the interface elements from the 3D view of the first content page on the display screen. For example, the animation can include "dropping" in 3D space the first page, wherein as the interface elements drop, at least a subset of the interface elements can be shown as traveling away from a user at different speeds. Accordingly, the interface elements can be shown as rotating, turning, or being animated in a number of different ways and at different speeds as the interface elements exit the display screen. The animation can further show 1310 a 3D appearance of one or more interface elements of a second content page on the display screen appearing in place of the interface elements of the first page. Thereafter, a representation of the second webpage can be displayed 1312. In various embodiments, the representation of the webpage can be a 2D representation, while in other embodiments the representation can be a 3D representation. In accordance with various embodiments, such animation can advantageously be used to mask latency while loading pages and can be used to modify or otherwise enhance the appearance of a page.

Figure 14:
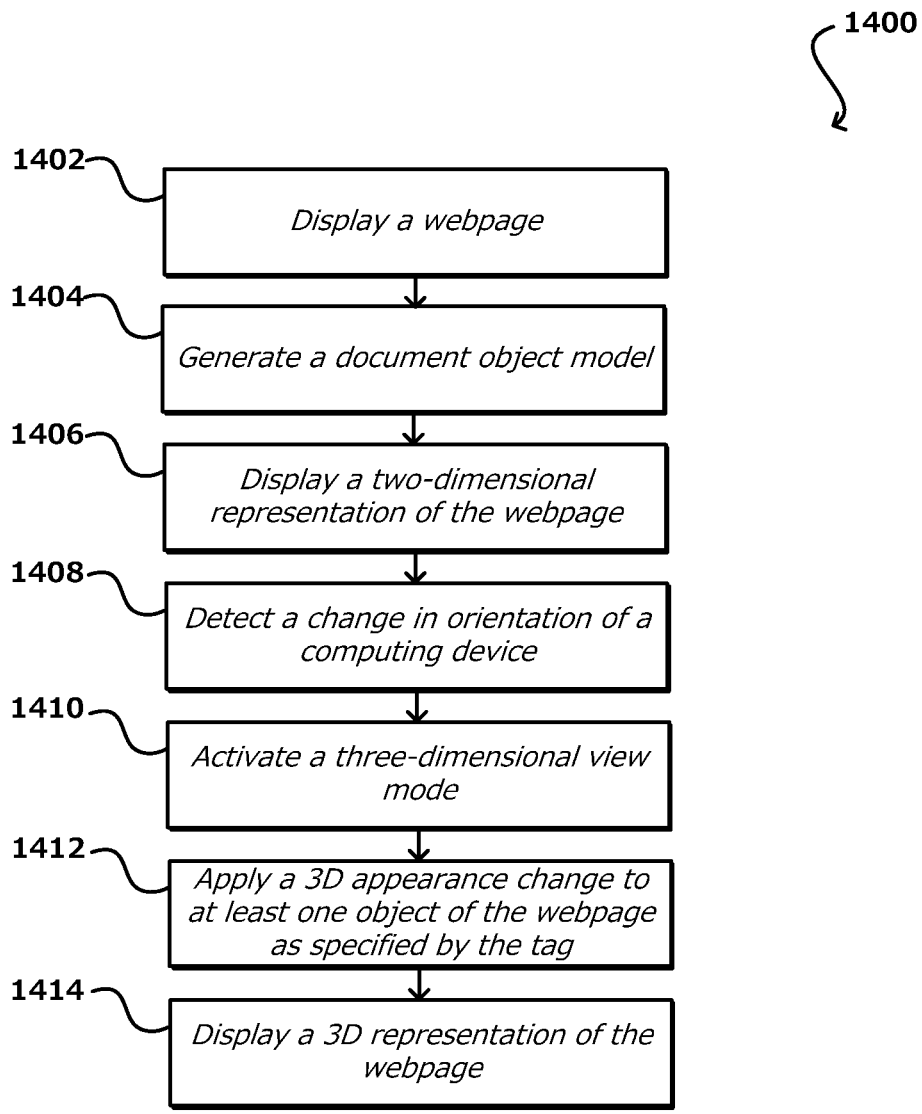
FIG. 14 illustrates an example process for rendering various interfaces in accordance with various embodiment.

FIG. 14 illustrates an example process for rendering various interfaces in accordance with various embodiments. As described, various embodiments provide for the ability to specify 3D attributes (such as the appearance, action, etc.) of the interface elements displayed on the interface (e.g., webpage, application, etc.) or other page. In this example, a request from a user to display a webpage on a display screen of the computing device is received 1402. The webpage can include one or more interface elements, such as an image, text, links, among other interface elements. A document object model can be generated 1404. The document object model can contain information used to display at least one interface element on the webpage. The document model can be organized in a tree structure that includes one or more nodes and at least a subset of those nodes can be associated with at least one tag.

At least a subset of the interface elements can also associated with a tag, attribute, or other element that specifies a 3D appearance change to be applied to a respective interface element when a 3D view mode is activated. The 3D appearance change specified by the tag can include at least one of a change in size, shape, shadowing effects, focus, coloring, position, and/or an animation of at least one element. In some situations, the type of appearance change specified by the tag can be based at least in part on one of a user profile or a page profile, wherein the user profile includes information indicative of at least one of a user's web history or user preferences and the page profile includes information indicative of a default three-dimensional representation. In some situations, the tag can be configured to specify a plurality of three-dimensional appearance changes, where a respective tag causes a three-dimensional appearance change based at least in part on an orientation of the computing device. For example, a tag can specify a first three-dimensional appearance change when a device is in a first orientation, and the tag can specify a second three-dimensional change when the device is in a second orientation.

In some embodiments, a developer of such pages can use information (e.g., tags, CSS, JavaScript, etc.) to specify the 3D appearance change to be applied, while in other embodiments, the interface may determine the 3D appearance change to be applied to at least one element of the interface without the developer specifying the 3D appearance change. For example, the interface can utilize a DOM hierarchy, object model, or other model hierarchy that includes such information to determine how to display or otherwise alter the appearance of the interface elements in 3D space (e.g., such as by bringing an element "forward" toward the front of the display screen or bringing an element "back" from the front of the display screen).

A 2D representation of the webpage is displayed 1406. When a change in orientation of the device is detected 1408, a three-dimensional view mode is activated 1410, which can cause the device to render a 3D or multi-layer appearance, or other such aspect of at least a subset of the one or more interface elements. As described, various embodiments enable interface elements to be highlighted, emphasized, animated, or otherwise altered in appearance and/or arrangement in the renderings of those interfaces based at least on an orientation of the device and/or user point of view of the user with respect to the device. When a subsequent change in orientation of the device is detected 1410, a 3D appearance change can be applied 1412 to the at least one interface element as specified by the tag. Thereafter, a 3D representation of at least a portion of the webpage is displayed 1414. In various embodiments, an action can be associated with an element that has not been tagged. For example, based on the type of element, the appearance of the element can be altered to appear to be closer to a surface of the display screen of the device and one or more actions can occur when selecting or otherwise interacting with the element. In accordance with various embodiments, elements can include phone numbers, addresses, URLs, images, contact information, dates, event information, etc. Actions can include causing the device to open a phone application and dial the phone number, causing the device to open a navigation application and provide directions to the address, causing the device to open an address book to save the address, causing the device to open a web browser to navigate to a webpage indicated by the URL, causing the device to open a photo album to save an image, causing the device to open an address book to save the contact information, etc. For example, in the situation where the interface element is a phone number, selecting the phone number can cause a phone application of the device to call the phone number. Another example can include rendering a 3D view of an image and providing a prompt or other interface element configured to save or otherwise store the image when the image is selected. Yet another example can include identifying a product on a page, rendering a 3D-representation of the product, and providing a button or other interface element along with the product configured to save the produce to a wish list or shopping cart of an electronic marketplace, among others.

In at least some embodiments, a computing device can utilize one or more cameras or other such sensors to determine the relative direction of the user. For example, FIG. 15(*a*) illustrates an example situation 1500 wherein a computing device 1502 is configured to utilize at least one camera element 1506 to attempt to locate a feature of a user, such as the user's head or eyes, for purposes of point of view determination. In this example, the user's eyes 1504 are located within the field of view 1508 of a camera of the computing device 1502. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 1510 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 15A:
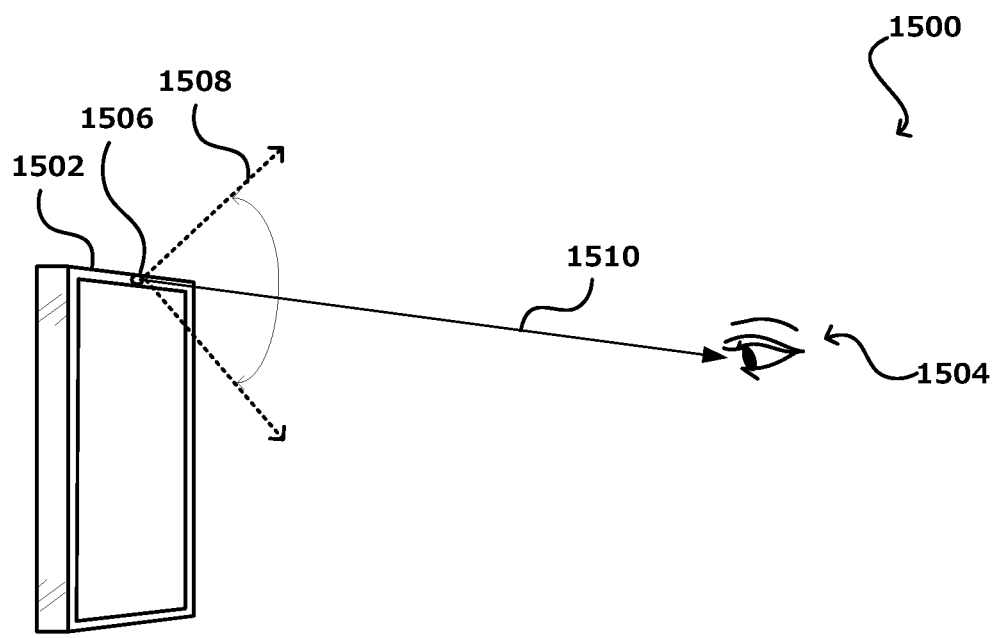
FIGS. 15(a) and 15(b) illustrate an example approach to determining the relative position of a user that can be utilized in accordance with various embodiments.
Figure 15B:
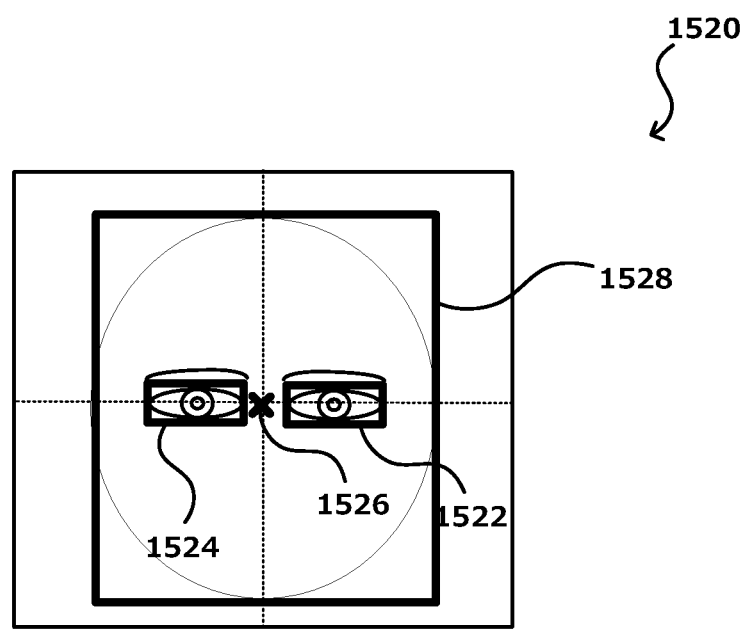

Further illustrating such an example approach, FIG. 15(*b*) illustrates an example image 1520 that could be captured of the user's head and eyes using the camera 1506 of FIG. 15(*a*). One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 1522, 1524 for each eye, or at least an approximate location 1528 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 1526 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, electronic compasses, and the like.

Figure 16A:
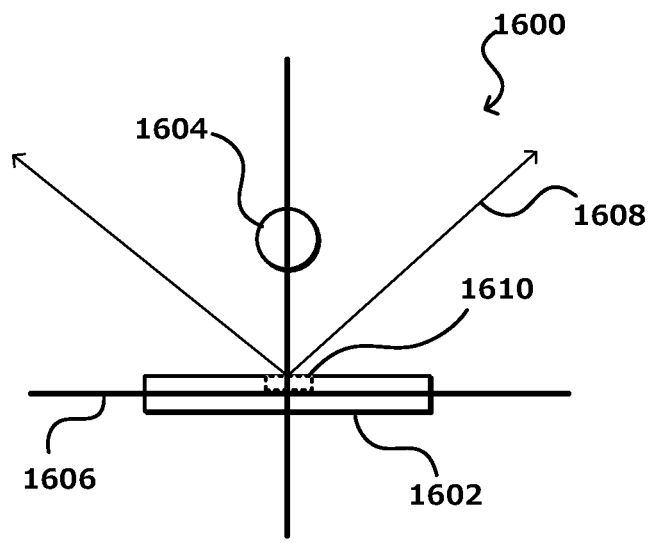
FIGS. 16(a) and 16(b) illustrate an example approach to determining device motion that can be utilized in accordance with various embodiments.
Figure 16B:
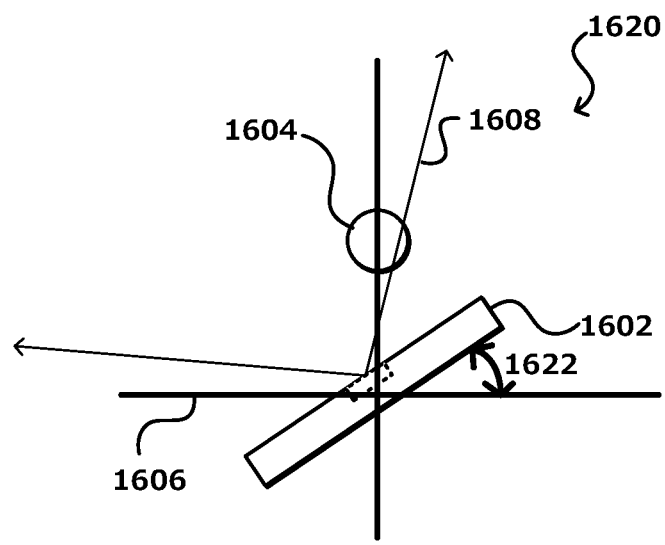

For example, FIG. 16(*a*) illustrates a "top view" 1600 of a computing device 1602 operable to capture an image of an object 1604 (e.g., a user's head) within an angular view 1608 of a camera 1610 of the computing device. In this example, the computing device 1602 includes at least one orientation- or rotation-determining element, such as an electronic compass or electronic gyroscope, that is able to determine a frame of reference 1606 in two or three dimensions with respect to a first orientation of the device. In at least some embodiments, an electronic compass might be used to determine an axis of the frame of reference 1606, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 1606 or orientation can be determined at or near the time of capture of a first image by a camera 1610 of the computing device 1602. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

FIG. 16(*b*) illustrates a second top view 1610 after a change in orientation of the computing device 1602. The electronic gyroscope (or other such component or embedded sensor) can detect the change in orientation, in this example corresponding to a change in angle 1612 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 1612 about a single axis. As illustrated, this causes the object 1604 to be moved to the right edge of the field of view 1608 of the camera 1610. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

Figure 17:
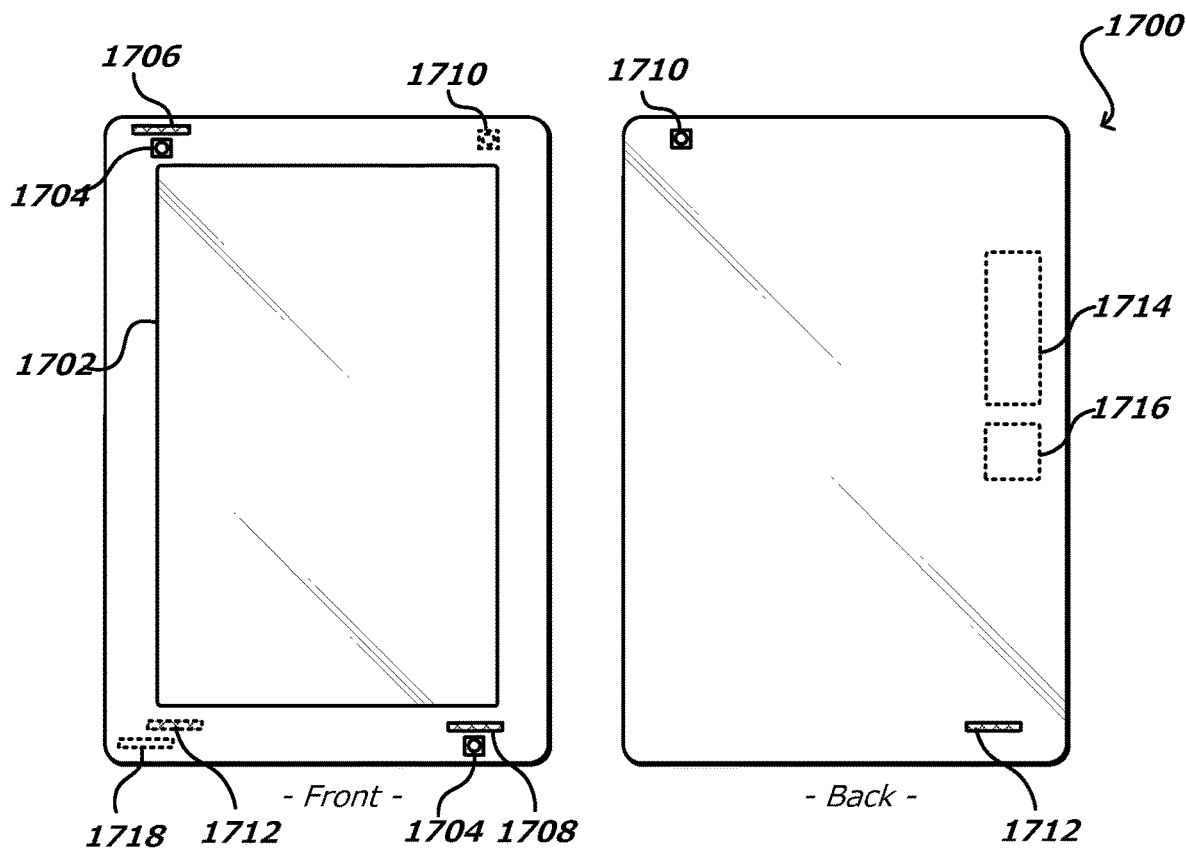
FIG. 17 illustrates an example device that can be used to implement aspects of the various embodiments.

FIG. 17 illustrates front and back views of an example electronic computing device 1700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1700 has a display screen 1702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1704 on the front of the device and at least one image capture element 1710 on the back of the device. It should be understood, however, that image capture elements could also, or alternatively, be placed on the sides or corners of the device, and that there can be any appropriate number of capture elements of similar or different types. Each image capture element 1704 and 1710 may be, for example, a camera, a charge-coupled device (CCD), a motion detection sensor or an infrared sensor, or other image capturing technology.

As discussed, the device can use the images (e.g., still or video) captured from the imaging elements 1704 and 1710 to generate a three-dimensional simulation of the surrounding environment (e.g., a virtual reality of the surrounding environment for display on the display element of the device). Further, the device can utilize outputs from at least one of the image capture elements 1704 and 1710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1708 on the front side, one microphone 1712 on the back, and one microphone 1706 on or near a top or side of the device. In some devices there may be only one microphone, while in other devices there might be at least one microphone on each side and/or corner of the device, or in other appropriate locations.

The device 1700 in this example also includes one or more orientation- or position-determining elements 1718 operable to provide information such as a position, direction, motion, or orientation of the device. These elements can include, for example, accelerometers, inertial sensors, electronic gyroscopes, and electronic compasses.

The example device also includes at least one communication mechanism 1714, such as may include at least one wired or wireless component operable to communicate with one or more electronic devices. The device also includes a power system 1716, such as may include a battery operable to be recharged through conventional plug-in approaches, or through other approaches such as capacitive charging through proximity with a power mat or other such device. Various other elements and/or combinations are possible as well within the scope of various embodiments.

Figure 18:
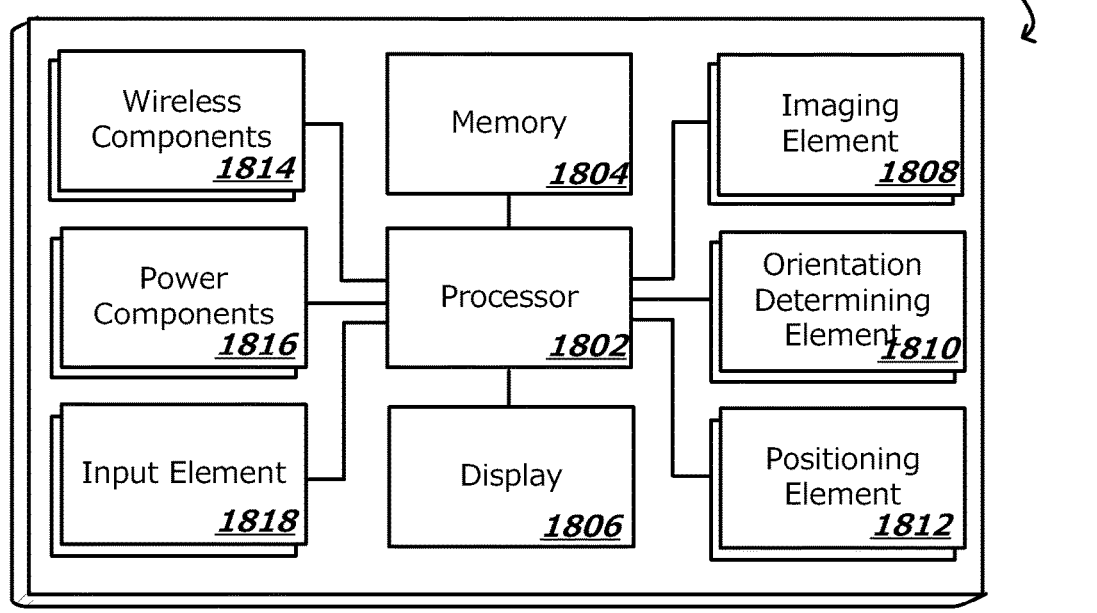
FIG. 18 illustrates example components of a client device such as that illustrated in FIG. 17.

FIG. 18 illustrates a set of basic components of an electronic computing device 1800 such as the device 1700 described with respect to FIG. 17. In this example, the device includes at least one processing unit 1802 for executing instructions that can be stored in a memory device or element 1804. As would be apparent to one of ordinary skill in the art, the device can include many types of memory, data storage, or computer-readable media, such as a first data storage for program instructions for execution by the processing unit(s) 1802, the same or separate storage can be used for images or data, a removable memory can be available for sharing information with other devices, and any number of communication approaches can be available for sharing with other devices.

The device typically will include some type of display element 1806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1800 also includes at least one orientation determining element 1810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 19:
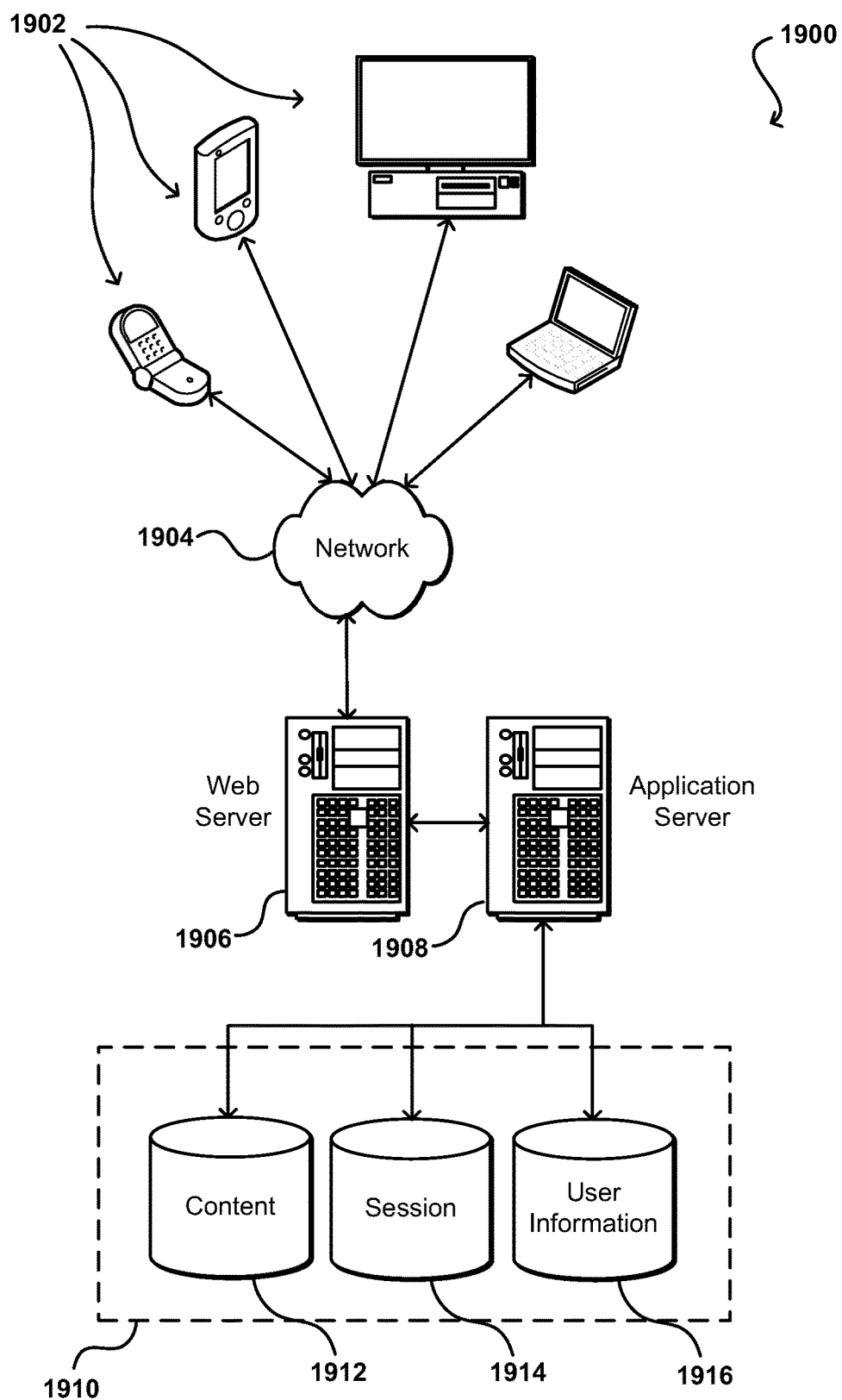
FIG. 19 illustrates an environment in which various embodiments can be implemented.

As discussed, different approaches can be implemented in various environments in accordance with the described embodiments. For example, FIG. 19 illustrates an example of an environment 1900 for implementing aspects in accordance with various embodiments. As will be appreciated, although a Web-based environment is used for purposes of explanation, different environments may be used, as appropriate, to implement various embodiments. The system includes electronic client devices 1918, 1920, 1922, and 1924, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1906 for receiving requests and serving content in response thereto, although for other networks, an alternative device serving a similar purpose could be used, as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1908 can include any appropriate hardware and software for integrating with the data store 1910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1906 in the form of HTML, XML or another appropriate structured language in this example. The handling of all requests and responses, as well as the delivery of content between the client devices 1918, 1920, 1922, and 1924 and the application server 1908, can be handled by the Web server 1906. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing content (e.g., production data) 1912 and user information 1916, which can be used to serve content for the production side. The data store is also shown to include a mechanism for storing log or session data 1914. It should be understood that there can be many other aspects that may need to be stored in the data store, such as page image information and access rights information, which can be stored in any of the above listed mechanisms as appropriate or in additional mechanisms in the data store 1919. The data store 1919 is operable, through logic associated therewith, to receive instructions from the application server 1908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1918, 1920, 1922 and 1924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a display screen;
   at least one computing device processor; and
   a memory device including instructions that, when executed by the at least one computing device processor, enables the computing device to:
   determine a change in orientation of the computing device;
   based at least in part on determining the change in orientation, transition from display of a two-dimensional view to display of a three-dimensional view of a first webpage on the display screen of the computing device, the first webpage including a first interface element of a first set of interface elements, the first set of interface elements including web links with a three-dimensional arrangement based in part on orientation of the computing device and eye position of a user of the computing device;
   receive a request from a user to navigate from the first webpage to a second webpage, the second webpage including a second interface element of a second set of interface elements;
   determine first relevant content associated with the first interface element based at least in part on user content preferences associated with a user profile;
   animate a three-dimensional departure of the first interface element from the three-dimensional view of the first webpage on the display screen, wherein the three-dimensional departure is determined based at least in part on the first relevant content and includes separating the first interface element into a plurality of three-dimensional segments;
   determine second relevant content associated with the second interface element based at least in part on the user content preferences; and
   animate a three-dimensional appearance of the second interface element associated with the second webpage on the display screen in place of the first interface element associated with the first webpage, wherein the three-dimensional appearance is determined based at least in part on the second relevant content.

2. The computing device of claim 1, wherein the instructions, when executed, further cause the computing device to:

render an animation of at least one of the plurality of three-dimensional segments departing the display screen in at least one direction at predetermined speed.

3. The computing device of claim 1, wherein the instructions, when executed, further cause the computing device to: render an animation of at least one of the three-dimensional segments departing the display screen in at least one direction at predetermined speed and render an animation of at least one segment of the second interface element entering the display screen in at least one direction at a predetermined speed.

4. The computing device of claim 3, wherein animating the three-dimensional departure of the first interface element from the first webpage and the three-dimensional appearance of the second interface element of the second webpage is configured to mask an amount of latency in rendering the second webpage.

5. A computer implemented method, comprising:
displaying, on a first webpage on a display screen of a computing device, a first set of content including one or more objects;
receiving a request to access a second webpage that includes a second set of content;
determining a change in orientation of the computing device;
based at least in part on determining the change in orientation, transitioning from display of a two-dimensional representation to display of a three-dimensional representation of the first set of content, the first set of content including web links with a three-dimensional arrangement based in part on orientation of the computing device and eye position of a user of the computing device;
determining first relevant content associated with the one or more objects of the first set of content based at least in part on user content preferences associated with a user profile;
animating a departure of the three-dimensional representation of the first set of content from the first webpage, wherein said departure is determined based at least in part on the first relevant content and includes separating at least one of the objects of the one or more objects into a plurality of three-dimensional segments;
determining second relevant content associated with the second set of content based at least in part on the user content preferences;
animating an appearance of displaying a three-dimensional representation of the second set of content, wherein the appearance is determined based at least in part on the second relevant content; and
displaying, on the display screen in place of the first set of content, the three-dimensional representation of the second set of content on the second webpage.

6. The computer implemented method of claim 5, wherein animating a departure of the three-dimensional representation of the first set of content from the first webpage further includes:
adjusting an appearance of the at least one of the objects of the first set of content to cause the at least one of the objects to appear to move from a first position to a second position, the at least one of the objects rendered in the first position appearing closer to a surface of the display screen than the at least one of the objects rendered in the second position.

7. The computer implemented method of claim 5, wherein animating a departure of the three-dimensional representation of the first set of content from the first webpage further includes:
animating a separation of the at least one of the objects, wherein a first object is rendered to appear to move away from a second object.

8. The computer implemented method of claim 7, wherein the first object appears to move away from the second object at a predetermined speed.

9. The computer implemented method of claim 7, wherein the first object appears to exit the display screen in a different direction than the second object appears to exit the display screen.

10. The computer implemented method of claim 5, wherein animating an appearance of displaying a three-dimensional representation of a second set of content further includes:
rendering a two-dimensional representation of the second set of content in place of the first set of content.

11. The computer implemented method of claim 10, wherein the three-dimensional representation of the at least one of the objects is displayed to appear closer to a surface of the display screen than at least one other object of the at least one of the objects.

12. The computer implemented method of claim 5, wherein the three-dimensional representation of the second set of content includes a plurality of objects, and animating an appearance of displaying a three-dimensional representation of a second set of content further includes:
displaying an animation of stitching together two of the plurality of objects.

13. The computer implemented method of claim 12, wherein two of the plurality of objects of the second set of content appear on a display screen of the computing device at different speeds.

14. The computer implemented method of claim 5,
rendering an animation of at least one interface element of a plurality of interface elements for the first set of content departing the display screen in at least one direction at predetermined speed; and
rendering an animation of at least one interface element of the plurality of interface elements for the second set of content entering the display screen in at least one direction at a predetermined speed.

15. The computer implemented method of claim 5, further comprising:
determining a network connection speed of the computing device;
determining an amount of time to load the second set of content onto the computing device based at least in part on the network connection speed; and
animating the appearance of the second set of content to occur over at least the determined amount of time,
wherein animating a departure of the first set of content and the appearance of the second set of content is configured to mask an amount of latency in rendering the second set of content.

16. A non-transitory computer readable storage medium storing one or more sequences of instructions executable by one or more processors to perform a set of operations comprising:
displaying, on a first webpage on a display screen of a computing device, a first set of content including one or more objects;
receiving a request to access a second webpage that includes a second set of content;

determining a change in orientation of the computing device;
based at least in part on determining the change in orientation, transitioning from display of a two-dimensional representation to display of a three-dimensional representation of the first set of content, the first set of content including web links with a three-dimensional arrangement based in part on orientation of the computing device and eye position of a user of the computing device;
determining first relevant content associated with the one or more objects of the first set of content based at least in part on user content preferences associated with a user profile;
animating a departure of the three-dimensional representation of the first set of content from the first webpage, wherein said departure is determined based at least in part on the first relevant content and includes separating at least one of the objects of the first set of content into a plurality of three-dimensional segments;
determining second relevant content associated with the second set of content based at least in part on the user content preferences;
animating an appearance of displaying a three-dimensional representation of the second set of content, wherein the appearance is determined based at least in part on the second relevant content; and
displaying, on the display screen in place of the first set of content, the three-dimensional representation of the second set of content on the second webpage.

17. The non-transitory computer readable storage medium of claim 16, wherein displaying the second set of content further includes instructions executed by the one or more processors to perform the operations of:
animating a three-dimensional appearance of one or more objects of the second set of content on the display screen in place of the one or more objects of the first set of content, wherein animating the three-dimensional appearance of the one or more objects of the second set of content further includes:
rendering a two-dimensional representation of the second set of content in place of the first set of content; and
rendering a three-dimensional representation of at least a subset of the one or more objects of the second set of content, wherein the three-dimensional representation of at least one of the one or more objects of the second set of content is displayed to appear closer to a surface of the display screen than at least one other object of the one or more objects.

18. The non-transitory computer readable storage medium of claim 16, wherein animating a departure of three-dimensional representation of the first set of content from the first webpage further includes instructions executed by the one or more processors to perform the operations of:
adjusting an appearance of at least one of the one or more objects of the first set of content to cause the at least one of the one or more objects to appear to move from a first position to a second position, the at least one of the one or more objects rendered in the first position appearing closer to a surface of the display screen than the at least one of the one or more objects rendered in the second position; and
animating a separation of the one or more objects, wherein a first object is rendered to appear to move away from a second object, wherein the first object appears to move away from the second object at a predetermined speed.

19. The non-transitory computer readable storage medium of claim 16, wherein a change in orientation of the computing device is determined based at least in part on images captured by a camera of the computing device or at least one sensor.

* * * * *